US012713429B2

(12) United States Patent
Su et al.

(10) Patent No.: US 12,713,429 B2
(45) Date of Patent: Aug. 18, 2026

(54) FEEDBACK INFORMATION TRANSMISSION METHOD AND RELATED APPARATUS

(71) Applicant: Huawei Technologies Co., Ltd., Shenzhen (CN)

(72) Inventors: Tong Su, Shenzhen (CN); Shengyu Li, Beijing (CN); Lei Guan, Beijing (CN); Ruijie Li, Beijing (CN); Yang Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 18/432,902

(22) Filed: Feb. 5, 2024

(65) Prior Publication Data

US 2024/0179709 A1 May 30, 2024

Related U.S. Application Data

(63) Continuation of application No. PCT/CN2022/104222, filed on Jul. 6, 2022.

(30) Foreign Application Priority Data

Aug. 6, 2021 (CN) ........................ 202110904539.X

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 27/26025* (2021.01); *H04W 72/21* (2023.01); *H04W 72/232* (2023.01)

(58) Field of Classification Search
CPC ............. H04W 72/1273; H04W 72/21; H04W 72/232; H04W 72/23; H04W 72/0446;
(Continued)

(56) References Cited

U.S. PATENT DOCUMENTS

2011/0261679 A1* 10/2011 Li ......................... H04L 5/0053 370/216
2015/0131496 A1* 5/2015 Han ........................ H04W 4/70 370/280
(Continued)

FOREIGN PATENT DOCUMENTS

WO 2021101314 A1 5/2021

OTHER PUBLICATIONS

Moderator (Nokia): "Moderator summary #2 on HARQ-ACK feedback enhancements for NR Rel-17 URLLC/IIoT", 3GPP Draft; R1-2101818, 3rd Generation Partnership Project (3GPP), Mobile Competence Centre; 650, Route Des Lucioles; F-06921 Sophia-Antipolis Cedex; France vol. RAN WG1, No. e-Meeting; Jan. 25, 2021-Feb. 58, 2021 Feb. 2021 (Feb. 8, 2021), XP051977624, total 175 pages.

(Continued)

*Primary Examiner* — Nimesh Patel
(74) *Attorney, Agent, or Firm* — Slater Matsil, LLP

(57) ABSTRACT

This application provides a feedback information transmission method and a related apparatus. When the first PUCCH resource overlaps the downlink symbol or the flexible symbol in time domain, the terminal device may switch the HARQ feedback information to another time unit for sending. This resolves low data transmission reliability because the HARQ feedback information cannot be sent and is discarded when the first PUCCH resource overlaps the downlink symbol or the flexible symbol.

20 Claims, 13 Drawing Sheets

(51) Int. Cl.

| | |
|---|---|
| ***H04L 27/26*** | (2006.01) |
| ***H04W 72/21*** | (2023.01) |
| ***H04W 72/232*** | (2023.01) |

(58) Field of Classification Search

CPC ......... H04W 72/0453; H04W 72/1268; H04W 72/231; H04W 72/20; H04W 92/18; H04W 72/02; H04W 72/04; H04W 72/51; H04W 88/08; H04W 72/12; H04W 72/56; H04W 72/30; H04W 74/006; H04W 24/10; H04W 72/40; H04W 72/563; H04W 72/535; H04W 72/121; H04W 64/00; H04W 72/044; H04W 56/0045; H04W 72/046; H04W 72/542; H04W 52/0235; H04W 74/002; H04W 84/042; H04W 72/0473; H04W 72/0457; H04W 28/0236; H04W 52/0245; H04W 52/42; H04W 92/10; H04W 4/08; H04W 28/26; H04W 16/28; H04W 72/54; H04W 72/541; H04W 76/40; H04W 52/48; H04W 76/15; H04W 36/0072; H04W 48/10; H04W 52/245; H04W 72/543; H04W 36/085; H04W 52/14; H04W 72/00; H04W 76/36; H04W 28/20; H04W 74/00; H04W 74/085; H04W 88/16; H04W 4/02; H04W 52/243; H04W 52/265; H04W 56/0065; H04W 16/00; H04W 16/08; H04W 28/0226; H04W 28/0231; H04W 28/0983; H04W 36/0064; H04W 36/32; H04W 36/34; H04W 4/029; H04W 4/38; H04W 28/16; H04W 16/10; H04W 24/02; H04W 52/146; H04W 80/02; H04W 72/53; H04L 1/1812; H04L 27/26025; H04L 1/18; H04L 1/1854; H04L 1/1861; H04L 1/16; H04L 5/0053; H04L 5/0055; H04L 1/1896; H04L 5/0094; H04L 1/1864; H04L 5/001; H04L 1/1887; H04L 5/0044; H04L 1/1822; H04L 5/0007; H04L 1/1614; H04L 5/0023; H04L 5/1469; H04L 5/0012; H04L 1/0031; H04L 27/2601; H04L 5/0016; Y02D 30/70; H04B 7/088; H04B 7/0626; H04B 7/06954; H04B 7/0617; H04B 7/0695; H04B 7/0413; H04B 17/327; H04B 17/27; H04B 17/318; H04B 7/0632; H04B 7/0408; H04B 7/15; H04B 7/06952; H04B 7/0456; H04B 7/0639; H04B 7/024; H04B 7/18543; H04B 1/713; H04B 17/24; H04B 17/309; H04B 7/15528; H04B 7/0697; H04J 11/00; H04J 11/0026; H04J 13/004; H04J 2011/0003; H04J 2011/0096; H04J 11/005; H04J 11/0056; H04J 11/0073; H04J 11/0053

See application file for complete search history.

(56) References Cited

U.S. PATENT DOCUMENTS

| | | | | |
|---|---|---|---|---|
| 2021/0105126 | A1* | 4/2021 | Yi | H04W 76/27 |
| 2021/0112600 | A1* | 4/2021 | Lei | H04W 72/04 |
| 2021/0219328 | A1* | 7/2021 | Xiong | H04L 1/1854 |
| 2021/0227570 | A1* | 7/2021 | Park | H04L 1/189 |
| 2023/0336312 | A1* | 10/2023 | Park | H04L 5/0055 |

OTHER PUBLICATIONS

Moderator (Nokia):"Final moderator summary on HARQ-ACK feedback enhancements for NR Rel-17 URLLC/IIoT." 3GPP TSG-RAN WG1 Meeting #105-e R1-2106249 e-Meeting, May 19-27, 2021. total 131 pages.

* cited by examiner

Target time unit
PCell 30 kHz
PDSCH
PUCCH
Target cell
SCell #1 15 kHz
SCell #2 15 kHz
SCell #3 60 kHz
SCell #4 60 kHz
First reference time unit
Second reference time unit (it is assumed that a K1 value is 1)
Indicated by first configuration information
Time unit #1
Time unit #4
SCell #3
PCell

Uplink slot Downlink slot

FEEDBACK INFORMATION TRANSMISSION METHOD AND RELATED APPARATUS

CROSS-REFERENCE TO RELATED APPLICATIONS

This application is a continuation of International Application No. PCT/CN2022/104222, filed on Jul. 6, 2022, which claims priority to Chinese Patent Application No. 202110904539.X, filed on Aug. 6, 2021. The disclosures of the aforementioned applications are hereby incorporated by reference in their entireties.

TECHNICAL FIELD

This application relates to the field of communication technologies, and in particular, to a feedback information transmission method and a related apparatus.

BACKGROUND

With development of communication technologies, a communication system imposes higher requirements on a transmission rate, a latency, power consumption, and the like. As one of three typical services of a new-generation communication system, ultra-reliable and low-latency communication (URLLC) is mainly applied to scenarios such as unmanned driving and telemedicine. Higher requirements on reliability and a latency are imposed for these application scenarios. For example, data transmission reliability reaches 99.999%, a transmission latency is less than 1 ms, and instruction overheads are reduced as much as possible while requirements for high reliability and a low latency are met. Therefore, how to improve the transmission delay and reliability becomes a problem of great concern in this field.

To resolve this problem, a hybrid automatic repeat request (HARQ) technology may be used. In this technology, a forward error correction (FEC) solution is introduced in an automatic retransmission request (ARQ) system. To be specific, FEC automatic error correction is used within an error correction capability range, and a transmit end needs to perform resending outside the error correction range, to improve system reliability.

However, when a terminal device supports carrier aggregation, HARQ feedback information of a downlink shared channel transmitted on each carrier can be sent only in a primary cell (PCell) or a physical uplink control channel (PUCCH) secondary cell (SCell). As a result, a success rate of transmitting the HARQ feedback information is low because of an insufficient resource for transmitting the HARQ feedback information.

SUMMARY

Embodiments of this application provide a feedback information transmission method and a related apparatus, to improve a success rate of transmitting HARQ feedback information.

According to a first aspect, this application provides a feedback information transmission method. The method may be performed by a terminal device or a module in the terminal device. The method includes: receiving first configuration information, where the first configuration information indicates a one-to-one correspondence between M reference time units and a plurality of cells configured to send hybrid automatic repeat request HARQ feedback information in the M reference time units, and M is a positive integer; receiving a physical downlink shared channel PDSCH, where an end symbol of the PDSCH is located in a first reference time unit in the M reference time units; determining a second reference time unit in the M reference time units based on the first reference time unit, where the second reference time unit is after the first reference time unit, the second reference time unit and the first reference time unit are separated by K1 reference time units, and K1 is an integer greater than or equal to 0; determining a target time unit in a target cell based on the second reference time unit and the one-to-one correspondence, where the target cell is a cell corresponding to the second reference time unit in the one-to-one correspondence, and the target time unit is a time unit that is in the target cell and that overlaps the second reference time unit in time domain; and sending HARQ feedback information of the PDSCH in the target time unit in the target cell, where time domain lengths of the M reference time units are the same, the time domain lengths of the reference time units are determined based on a first subcarrier spacing, and the first subcarrier spacing is: a largest subcarrier spacing in subcarrier spacings corresponding to the plurality of cells, or a smallest subcarrier spacing in subcarrier spacings corresponding to the plurality of cells.

It can be learned that, in the feedback information transmission method, based on the one-to-one correspondence that is between the reference time units and the cells and that is indicated by the first configuration information, the HARQ feedback information may be switched to one target cell for sending, which is not limited to a PCell or a PUCCH SCell for sending, so that a success rate of transmitting the HARQ feedback information can be improved.

In the correspondence indicated by the first configuration information, the plurality of cells may be all cells that are of the terminal device and that are configured to send the HARQ feedback information, or may be some cells configured to send the HARQ feedback information. In an optional implementation, the first subcarrier spacing is the largest subcarrier spacing in the subcarrier spacings respectively corresponding to the plurality of cells. Compared with a time domain length that is of a subcarrier spacing and that is used for feedback limited to a PCell or a PUCCH SCell, the time domain length that is of the time unit and that is determined in this implementation has a smallest value in the time domain lengths of the time units corresponding to the plurality of cells, and the HARQ feedback information is transmitted in the time unit with the smallest time domain length, so that a feedback delay is reduced.

In another optional implementation, the first subcarrier spacing is the smallest subcarrier spacing in the subcarrier spacings respectively corresponding to the plurality of cells. Compared with a time domain length that is of a subcarrier spacing and that is used for feedback limited to a PCell or a PUCCH SCell, the time domain length that is of the time unit and that is determined in this implementation has a largest value in the time domain lengths of the time units corresponding to the plurality of cells, the HARQ feedback information is transmitted in the time unit with the largest time domain length, so that a moment at which channel quality is good is selected from long time domain duration to transmit the HARQ feedback information, thereby improving a success rate of transmitting the feedback information.

In still another optional implementation, the first subcarrier spacing is configured by a network device, and is used by the terminal device to determine the time domain length of the reference time unit. In this way, the network device can adjust the time domain length of the reference time unit in time based on system load and a channel status by using the first subcarrier spacing, to flexibly configure a relationship between a feedback delay and a feedback success rate.

In still another optional implementation, the first subcarrier spacing is predefined. In this way, resource overheads required for configuration and complexity are reduced.

In an optional implementation, if there are a plurality of time units in the target cell that overlap the second reference time unit in time domain, the target time unit is a time unit at a foremost time domain location in time units that are in the target cell and that overlap the second reference time unit in time domain. In this implementation, a feedback delay is reduced.

In another optional implementation, if there are a plurality of time units in the target cell that overlap the second reference time unit in time domain, the target time unit is a time unit at a rearmost time domain location in time units that are in the target cell and that overlap the second reference time unit in time domain. In this implementation, the target time unit can be located as late as possible in time domain. This avoids that the terminal device discards the feedback information due to an insufficient data processing capability, and improves a success rate of sending the feedback information.

In addition, when the plurality of cells have a plurality of corresponding subcarrier spacings, the network device may flexibly indicate the foregoing optional configuration manner of the first subcarrier. This resolves a low success rate of transmitting the HARQ feedback information when the first subcarrier spacing can be only the subcarrier spacing of the PCell or the PUCCH SCell.

In an optional implementation, K1 is indicated by downlink control information DCI for scheduling the PDSCH, and K1 is a value in a K1 set. For ease of description, in an optional implementation, the time unit in which the HARQ feedback information is transmitted is briefly referred to as a feedback time unit.

In an optional implementation, the K1 set is a K1 set configured for a cell in which the PDSCH is located. In this way, when the feedback time unit is determined, a feedback delay required for the PDSCH of the cell and/or an uplink transmission capability of the terminal device may be combined.

In another optional implementation, the K1 set is a K1 set configured for a primary cell accessed by the terminal device. In this way, when the feedback time unit is determined, a feedback delay required for the PDSCH of the primary cell and/or an uplink transmission capability of the terminal device may be combined.

In still another optional implementation, the K1 set is a K1 set configured for a cell with the smallest subcarrier spacing in the plurality of cells. In this way, considering a feedback delay required for the PDSCH of the cell with the smallest subcarrier spacing, the feedback time unit is determined based on the K1 set.

In still another optional implementation, when there are a plurality of cells with a smallest subcarrier spacing in the plurality of cells, the K1 set is a K1 set configured for a cell with a smallest or largest index in the cells with the smallest subcarrier spacing in the plurality of cells, so that when there are the plurality of cells with the smallest subcarrier spacing in the plurality of cells, the network device and the terminal device use the aligned K1 set.

In still another optional implementation, the K1 set is a K1 set configured for a cell with the largest subcarrier spacing in the plurality of cells. In this way, when the feedback time unit is determined, a feedback delay required for the PDSCH of the cell with the largest subcarrier spacing may be considered.

In still another optional implementation, when there are a plurality of cells with a smallest subcarrier spacing in the plurality of cells, the K1 set is a K1 set configured for a cell with a smallest or largest index in cells with a largest subcarrier spacing in the plurality of cells, so that when there are the plurality of cells with the largest subcarrier spacing in the plurality of cells, the network device and the terminal device use the aligned K1 set.

In still another optional implementation, the K1 set is configured by the network device, and is used to determine, with reference to the first configuration information, a feedback time unit and a cell in which the HARQ feedback information is sent in the feedback time unit. In this way, the network device adjusts a relationship between the feedback delay and the feedback success rate in time based on system load and a channel status by using the K1 set associated with the first configuration information.

In still another optional implementation, the K1 set is a K1 set associated with the predefined first configuration information. In this way, resource overheads required for configuration and complexity are reduced.

In the foregoing optional implementations, the K1 set is not limited to the K1 set configured for the PCell or the PUCCH SCell, so that flexibility of transmitting the HARQ feedback information can be further improved.

According to a second aspect, this application further provides a feedback information transmission method. The feedback information transmission method is performed by a network device or a module in the network device. The method includes: sending first configuration information, where the first configuration information indicates a one-to-one correspondence between M reference time units and a plurality of cells configured to send hybrid automatic repeat request HARQ feedback information in the M reference time units, and M is a positive integer; sending a physical downlink shared channel PDSCH, where an end symbol of the PDSCH is located in a first reference time unit in the M reference time units; determining a second reference time unit in the M reference time units based on the first reference time unit, where the second reference time unit is after the first reference time unit, the second reference time unit and the first reference time unit are separated by K1 reference time units, and K1 is an integer greater than or equal to 0; determining a target time unit in a target cell based on the second reference time unit and the one-to-one correspondence, where the target cell is a cell corresponding to the second reference time unit in the one-to-one correspondence, and the target time unit is a time unit that is in the target cell and that overlaps the second reference time unit in time domain; and receiving HARQ feedback information of the PDSCH in the target time unit in the target cell, where time domain lengths of the M reference time units are the same, the time domain lengths of the reference time units are determined based on a first subcarrier spacing, and the first subcarrier spacing is: a largest subcarrier spacing in subcarrier spacings corresponding to the plurality of cells, or a smallest subcarrier spacing in subcarrier spacings corresponding to the plurality of cells.

In this aspect, for related implementations and beneficial effects of the feedback information transmission method, refer to related descriptions of the first aspect. Details are not described herein again.

According to a third aspect, this application provides another feedback information transmission method. The feedback information transmission method is performed by a terminal device or a module in the terminal device. The feedback information transmission method includes:

receiving first configuration information, where the first configuration information indicates a one-to-one correspondence between M reference time units and a plurality of cells configured to send hybrid automatic repeat request HARQ feedback information in the M reference time units, and M is a positive integer;

receiving a physical downlink shared channel PDSCH, where an end symbol of the PDSCH is located in a first reference time unit in the M reference time units;

determining a second reference time unit in the M reference time units based on the first reference time unit, where the second reference time unit is after the first reference time unit, the second reference time unit and the first reference time unit are separated by K1 reference time units, and K1 is an integer greater than or equal to 0;

determining a first time unit in a first cell based on the second reference time unit and the one-to-one correspondence, where the first cell is a cell corresponding to the second reference time unit in the one-to-one correspondence, and the first time unit is a time unit that is in the first cell and that overlaps the second reference time unit in time domain;

determining a second time unit when a first physical uplink control channel PUCCH resource overlaps a downlink symbol or a flexible symbol in time domain, where the second time unit is after the first time unit, and the first PUCCH resource is a PUCCH resource that is in the first cell, is located in the first time unit, and is configured to carry HARQ feedback information of the PDSCH; and sending the HARQ feedback information of the PDSCH on a second PUCCH resource in the second time unit, where the second PUCCH resource does not overlap a downlink symbol or a flexible symbol in time domain.

It can be learned that when the first PUCCH resource overlaps the downlink symbol or the flexible symbol in time domain, the terminal device may switch the HARQ feedback information to another time unit for sending. This resolves low data transmission reliability because the HARQ feedback information cannot be sent and is discarded when the first PUCCH resource overlaps the downlink symbol or the flexible symbol. Therefore, in the feedback information transmission method, a success rate of transmitting the HARQ feedback information can be improved.

The second time unit is a time unit in a second cell.

In an optional implementation, the second cell is the first cell, and the second time unit is an earliest available time unit in time domain in at least one available time unit in the second cell. A candidate PUCCH resource in each of the at least one available time unit does not overlap a downlink symbol or a flexible symbol. In this implementation, the HARQ feedback information can be transmitted in time through switching between the time domains. This avoids a problem that the HARQ feedback information cannot be sent and is discarded because the PUCCH resource overlaps the downlink symbol or the flexible symbol, and improves a success rate of transmitting the HARQ feedback information.

In another optional implementation, the second cell is a cell other than the first cell in the plurality of cells. In this implementation, when the first PUCCH resource overlaps the downlink symbol or the flexible symbol in time domain, the HARQ feedback information is transmitted in time through switching of the time domain and a frequency domain. This avoids a problem that the HARQ feedback information cannot be sent and is discarded because the PUCCH resource overlaps the downlink symbol or the flexible symbol, and improves a success rate of transmitting the HARQ feedback information.

In the optional implementation, in a possible implementation, the second cell is a cell corresponding to a third reference time unit in M reference time units in a one-to-one correspondence, the second time unit is a time unit that is in the second cell and that overlaps the third reference time unit in time domain. The third reference time unit is an earliest available reference time unit in time domain in at least one available reference time unit. Each of the at least one available reference time unit is after the second reference time unit, a cell corresponding to each available reference time unit in the one-to-one correspondence is an available candidate cell, a candidate PUCCH resource in a third time unit in the available candidate cell does not overlap a downlink symbol or a flexible symbol, and the third time unit is a time unit that is in the available candidate cell and that overlaps the reference time unit corresponding to the available candidate cell in the one-to-one correspondence.

It can be learned that in this implementation, the earliest reference time unit in time domain may be selected from the at least one available reference time unit, and the second cell is further obtained based on the one-to-one correspondence, to send the HARQ feedback information. In this way, a problem that HARQ feedback information cannot be sent when the first PUCCH resource in the first time unit overlaps the downlink symbol or the flexible symbol is resolved, and a success rate of transmitting the HARQ feedback information is improved.

In the optional implementation, in another possible implementation, the second cell is a default cell, and the default cell may be predefined or preconfigured. The second time unit is an earliest available time unit in time domain in at least one available time unit in the second cell, and a candidate PUCCH resource in each of the at least one available time unit does not overlap a downlink symbol or a flexible symbol.

It can be learned that in this implementation, when the first PUCCH resource in the first time unit overlaps the downlink symbol or the flexible symbol, the HARQ feedback information may be switched to the second time unit of another cell for sending, so that a success rate of transmitting the HARQ feedback information is improved.

In the foregoing optional implementation, the candidate PUCCH resource is configured to carry the HARQ feedback information. The candidate PUCCH resource may be determined based on a total quantity of bits of HARQ feedback information that can be transmitted in the third time unit. Details are not described herein again.

In an optional implementation, in the feedback information transmission method, time domain lengths of the M reference time units are the same, and the time domain lengths of the reference time units are determined based on a first subcarrier spacing.

For a possible implementation of the first subcarrier spacing, refer to the possible implementation of the first subcarrier spacing described in the first aspect. Details are not described herein again. In addition, in still another optional implementation of this aspect, the first subcarrier spacing is a subcarrier spacing of the foregoing default cell.

In an optional implementation, if there are a plurality of time units in the first cell that overlap the second reference time unit in time domain, the first time unit is a time unit at a foremost time domain location in the time units that are in the first cell and that overlap the second reference time unit in time domain. Similarly, the second time unit may also be determined in this manner. In this implementation, a feedback delay is reduced.

In another optional implementation, if there are a plurality of time units in the first cell that overlap the second reference time unit in time domain, the first time unit is a time unit at a rearmost time domain location in the time units that are in the first cell and that overlap the second reference time unit in time domain. Similarly, the second time unit may also be determined in this manner. In this implementation, the target time unit can be located as late as possible in time domain. This avoids that the terminal device discards the feedback information due to an insufficient data processing capability, and improves a success rate of sending the feedback information.

In an optional implementation, K1 is indicated by downlink control information DCI for scheduling the PDSCH, and K1 is a value in a K1 set. For an optional implementation of the K1 set, refer to related content described in the first aspect. Details are not described herein again.

According to a fourth aspect, this application further provides a feedback information transmission method. The method corresponds to the feedback information transmission method according to the third aspect, and is performed by a network device or a module in the network device. The method includes: sending first configuration information, where the first configuration information indicates a one-to-one correspondence between M reference time units and a plurality of cells configured to send hybrid automatic repeat request HARQ feedback information in the M reference time units, and M is a positive integer; sending a physical downlink shared channel PDSCH, where an end symbol of the PDSCH is located in a first reference time unit in the M reference time units; determining a second reference time unit in the M reference time units based on the first reference time unit, where the second reference time unit is after the first reference time unit, the second reference time unit and the first reference time unit are separated by K1 reference time units, and K1 is an integer greater than or equal to 0; determining a first time unit in a first cell based on the second reference time unit and the one-to-one correspondence, where the first cell is a cell corresponding to the second reference time unit in the one-to-one correspondence, and the first time unit is a time unit that is in the first cell and that overlaps the second reference time unit in time domain; determining a second time unit when a first physical uplink control channel PUCCH resource overlaps a downlink symbol or a flexible symbol in time domain, where the second time unit is after the first time unit, and the first PUCCH resource is a PUCCH resource that is in the first cell, is located in the first time unit, and is configured to carry HARQ feedback information of the PDSCH; and receiving the HARQ feedback information of the PDSCH on a second PUCCH resource in the second time unit, where the second PUCCH resource does not overlap a downlink symbol or a flexible symbol in time domain.

For a detailed implementation and beneficial effects, refer to related content described in the third aspect. Details are not described herein again.

According to a fifth aspect, this application provides a communication apparatus. The communication apparatus may be a terminal device, an apparatus in the terminal device, or an apparatus that can be used together with the terminal device. The communication apparatus may alternatively be a chip system. The communication apparatus may perform the method according to the first aspect or the third aspect. Functions of the communication apparatus may be implemented by hardware, or may be implemented by hardware by executing corresponding software. The hardware or software includes one or more units or modules corresponding to the foregoing functions. The unit or module may be software and/or hardware. For operations performed by the communication apparatus and beneficial effects, refer to the method and beneficial effects in the first aspect or the third aspect.

According to a sixth aspect, this application provides a communication apparatus. The communication apparatus may be a network device, an apparatus in the network device, or an apparatus that can be used together with the network device. The communication apparatus may alternatively be a chip system. The communication apparatus may perform the method according to the second aspect or the fourth aspect. Functions of the communication apparatus may be implemented by hardware, or may be implemented by hardware by executing corresponding software. The hardware or software includes one or more units or modules corresponding to the foregoing functions. The unit or module may be software and/or hardware. For operations performed by the communication apparatus and beneficial effects, refer to the method and beneficial effects in the second aspect or the fourth aspect.

According to a seventh aspect, this application provides a communication apparatus. The communication apparatus includes a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement the method according to any one of the first aspect to the fourth aspect by using a logic circuit or executing code instructions.

According to an eighth aspect, this application provides a computer-readable storage medium. The storage medium stores instructions, and when the computer program or the instructions are executed by a communication apparatus, the method according to any one of the first aspect to the fourth aspect is implemented.

According to a ninth aspect, this application provides a computer program product including instructions. When a communication apparatus reads and executes the instructions, the communication apparatus is enabled to perform the method according to any one of the first aspect to the fourth aspect.

According to a tenth aspect, this application provides a communication system, including at least one communication apparatus configured to perform the method according to the first aspect, and at least one communication apparatus configured to perform the method according to the second aspect, or including at least one communication apparatus configured to perform the method according to the third aspect, and at least one communication apparatus configured to perform the method according to the fourth aspect.

BRIEF DESCRIPTION OF THE DRAWINGS

FIG. 12 is a schematic flowchart of a feedback information transmission method 200 according to an embodiment of this application;

DETAILED DESCRIPTION OF ILLUSTRATIVE EMBODIMENTS

The following describes in detail specific embodiments of this application with reference to the accompanying drawings.

This application may be applied to communication systems such as standalone, namely, a new base station, a backhaul link, and a core network that are deployed in a future network, or may be applied to various communication systems such as non-standalone.

For example, the technical solutions of this application may be applied to a 5th generation (5G) system, which may be referred to as a new radio (NR) system, a 6th generation (6G) system, a 7th generation (7G) system, or another future communication system; or may be further applied to a device to device (D2D) system, a machine to machine (M2M) system, a long term evolution (LTE) system, a carrier aggregation (CA) system, a dual connectivity (DC) technology system, and the like. In a CA or DC scenario, a terminal device may be connected to two base stations simultaneously, and the two base stations may provide a service. One base station or each of two base stations may be an NR base station, for example, a gNB. One base station may be a master node (MN), and the other base station may provide a service for the terminal device in a manner of adding a secondary carrier or adding a secondary base station.

Figures 1, 2, 3:
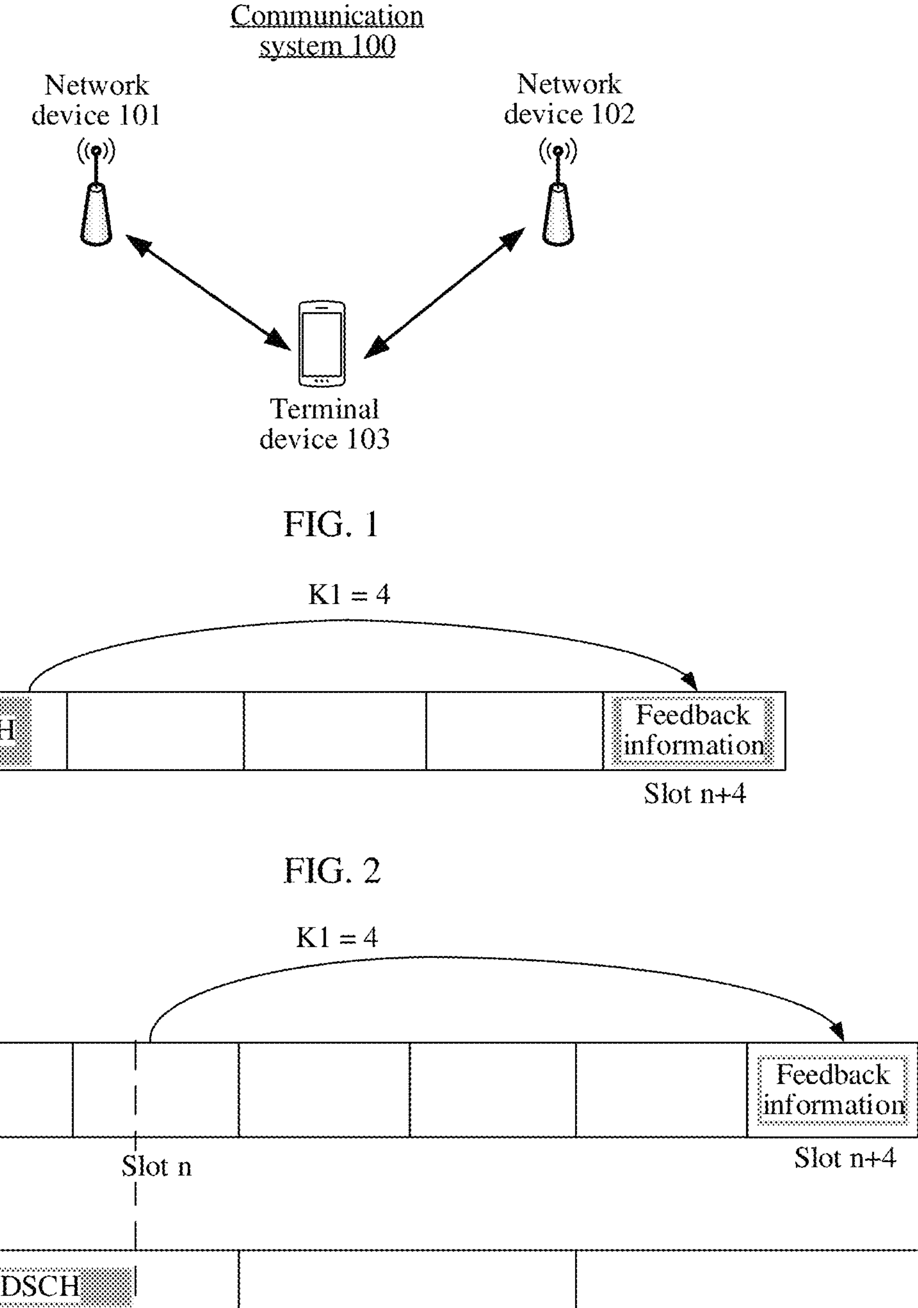
FIG. 1 is a schematic diagram of a structure of a communication system 100.
FIG. 2 is a schematic diagram of a feedback information transmission method by using an example in which an uplink subcarrier spacing is the same as a downlink subcarrier spacing.
FIG. 3 is a schematic diagram of a feedback information transmission method by using an example in which an uplink subcarrier spacing is different from a downlink subcarrier spacing.

By way of example, and not limitation, a feedback information transmission method described in this application may be applied to a communication system shown in FIG. 1. FIG. 1 is a schematic diagram of a scenario of a communication system 100. The communication system 100 may include but is not limited to a plurality of network devices (for example, a network device 101 and a network device 102) and one or more terminal devices (for example, a terminal device 103). The plurality of network devices may schedule a same terminal, and provide a downlink service for one terminal, or receive an uplink service from one terminal. The network devices may communicate with each other through an Xn interface.

Optionally, in the communication system 100 shown in FIG. 1, the network device 102 may add the network device 101 as a secondary carrier or a secondary base station. In addition, the terminal device may send capability information to the network device 102, and the network device 102 may determine, based on the capability information reported by the terminal device, to add the network device 101 in a CA manner and a DC manner.

In this embodiment of this application, the network device may be a device having a wireless transceiver function or a chip that may be disposed in the device. The network device includes but is not limited to an evolved NodeB (eNB), a radio network controller (RNC), a NodeB (NB), a network device controller (BSC), a network device transceiver station (BTS), a home network device (for example, a home evolved NodeB or a home NodeB, HNB), a baseband unit (BBU), an access point (AP) in a wireless fidelity (Wi-Fi) system, a wireless relay node, a wireless backhaul node, a transmission reception point (TRP), or a transmission point (TP). Alternatively, the network device may be a device used in a 5G, 6G, or even 7G system, for example, a gNB or a transmission point (TRP or TP) in an NR system, or one antenna panel or a group of (including a plurality of antenna panels) antenna panels of a network device in a 5G system; or may be a network node that forms a gNB or a transmission point, for example, a baseband unit (BBU), a distributed unit (DU), or a road side unit (RSU) in a vehicle to everything (V2X) or smart driving scenario.

In some deployments, the gNB or the transmission point may include a central unit (CU) and a DU. The gNB or the transmission point may further include a radio frequency unit (RU). The CU implements some functions of the gNB or the transmission point, and the DU implements some functions of the gNB or the transmission point. For example, the CU implements functions of a radio resource control (RRC) layer and a packet data convergence layer protocol (PDCP) layer, and the DU implements functions of a radio link control (RLC) layer, a media access control (MAC) layer, and a physical layer (PHY). Information at the RRC layer finally becomes information at the physical layer or is transformed from information at the physical layer. Therefore, in such an architecture, it may be considered that higher layer signaling such as RRC layer signaling or PDCP layer signaling is sent by the DU or is sent by the DU and the RU. It may be understood that the network device may be a CU node, a DU node, or a device including a CU node and a DU node.

In addition, the CU may be classified as a network device in a radio access network (RAN), namely, an access network device; or the CU may be classified as a network device in a core network (CN), which is briefly referred to as a core network device. This is not limited herein.

In embodiments of this application, the terminal device may include but is not limited to user equipment (UE), an access terminal, a subscriber unit, a subscriber station, a mobile station, a remote station, a remote terminal, a mobile device, a user terminal, a user agent, or a user apparatus. For another example, the terminal device may be a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or a wireless terminal or an RSU of a wireless terminal type in V2X vehicle to everything, or the like.

To clearly describe the technical solutions in embodiments of this application, the terms such as "first" and "second" are used in embodiments of this application to distinguish between same items or similar items that have basically a same function or purpose. A person skilled in the art may understand that the terms such as "first" and "second" do not limit a quantity and an execution sequence, and the terms such as "first" and "second" do not indicate a definite difference. The term "and/or" describes an association relationship for describing associated objects and indicates that three relationships may exist. For example, A and/or B may indicate the following three cases: Only A exists, both A and B exist, and only B exists. The character "/" usually indicates an "or" relationship between the associated objects.

The following first describes related concepts in this application.

1. Time Unit

There are a plurality of time units (which may also be briefly referred to as time domain units) in a communication system. One time unit may be one or more radio frames, one or more subframes, one or more slots, one or more mini-slots, one or more symbols, or the like. A symbol may be an orthogonal frequency division multiplexing (OFDM) symbol or a discrete Fourier transform spread spectrum orthogonal frequency division multiplexing (DFT-S-OFDM) symbol. A time length of one radio frame is 10 ms, a time length of one subframe is 1 ms, and one slot includes 14 symbols in a case of a normal cyclic prefix, or includes 12 symbols in a case of an extended cyclic prefix. The cyclic prefix is formed by moving a signal at a symbol tail to a head.

2. Data Scheduling Manner

The data scheduling manner may include two manners. One is a semi-persistent scheduling manner, and the other is a dynamic scheduling manner. The following separately describes the two manners.

2.1 Semi-Persistent Scheduling Manner

In the semi-persistent scheduling manner, the network device configures one or more sets of semi-persistent scheduling (SPS) configuration information for the terminal device, and notifies, through one activation physical downlink control channel (PDCCH), the terminal device of one set of used SPS configuration information. A scheduling periodicity is configured in the set of SPS configuration information. In addition, the activation PDCCH can further indicate a time-frequency resource on which a physical downlink shared channel (PDSCH) is located. In this way, the terminal device may receive the PDSCH on a time-frequency resource indicated in each periodicity. It can be learned that, in the semi-persistent scheduling manner, the network device does not need to send one PDCCH each time before transmitting a PDSCH. Each PDSCH scheduled in the semi-persistent scheduling manner may be briefly referred to as an SPS PDSCH.

The following briefly describes the SPS configuration information and the activation PDCCH. In addition, to ensure transmission reliability, HARQ feedback information indicating a PDSCH receiving status is further described.

One set of SPS configuration information includes: (1) an index (or referred to as an identifier) corresponding to the set of SPS configuration information; (2) a periodicity (for example, a minimum periodicity is 10 ms); and (3) a physical uplink control channel (PUCCH) resource configuration. The PUCCH resource configuration is mainly used to configure a PUCCH resource, for example, symbols in a periodicity, and the PUCCH resource may be used to carry uplink control information. In this application, the uplink control information includes HARQ feedback information, and may specifically include HARQ-ACK information or HARQ-NACK information.

Downlink control information (DCI) carried in the activation PDCCH may be referred to as activation DCI, and may indicate a slot in which the SPS PDSCH is located, and a start symbol S and a length L in the slot. For example, after receiving a PDSCH, the terminal device determines HARQ feedback information of the PDSCH, and sends the HARQ feedback information to the network device, so that the network device determines whether the PDSCH needs to be retransmitted.

The activation DCI may further indicate a time unit in which HARQ feedback information of each SPS PDSCH is located. For example, the activation DCI may indicate a parameter K1, and a field indicating the parameter K1 may be referred to as a K1 indication field, and is a "PDSCH-to-HARQ_feedback timing indicator" field in the DCI. The parameter K1 may correspond to one K1 value in one K1 set, and represents a quantity of slots between a slot in which one SPS PDSCH is located and a slot in which HARQ feedback information of the SPS PDSCH is located. The K1 set is a set configured by using higher layer signaling, and is a "dl-DataToUl-ACK" field in the PUCCH resource configuration.

Time domain lengths of time units whose subcarrier spacings have different values are different. For example, a time domain length of a slot whose subcarrier spacing is 15 kHz is twice a time domain length of a slot whose subcarrier spacing is 30 kHz. Therefore, when a feedback time unit is determined, an uplink/downlink subcarrier spacing further needs to be considered.

For example, in FIG. 2, an example in which an uplink subcarrier spacing is the same as a downlink subcarrier spacing is used, that is, time domain lengths of uplink and downlink slots are the same. As shown in FIG. 2, if a slot in which an SPS PDSCH is located is a slot n, and a K1 value corresponding to a parameter K1 that is in a K1 set and that is indicated by activation DCI is 4, the terminal device feeds back HARQ feedback information of the SPS PDSCH in a slot n+4.

Optionally, if the uplink subcarrier spacing is different from the downlink subcarrier spacing, an uplink slot corresponding to an end moment of the SPS PDSCH needs to be determined, and a slot in which the HARQ feedback information of the SPS PDSCH is located is then determined based on the K1 value. For example, in FIG. 3, an example in which an uplink subcarrier spacing is 30 kHz and a downlink subcarrier spacing is 15 kHz is used. Consequently, a length of a downlink slot is twice a length of an uplink slot. Therefore, assuming that an uplink slot corresponding to an end moment of an SPS PDSCH sent in a downlink slot m is a slot n, and a K1 value corresponding to a parameter K1 that is in a K1 set and that is indicated by activation DCI is 4, the terminal device feeds back HARQ feedback information of the SPS PDSCH in an uplink slot n+4.

In addition to determining a feedback time unit, the terminal device further needs to know a PUCCH resource for transmitting the HARQ feedback information in the feedback time unit. For ease of description, the resource in the slot is referred to as a feedback resource. The terminal device determines, based on a total quantity of bits of HARQ feedback information that needs to be fed back in the feedback time unit and from a plurality of PUCCH resources configured by the network device for the terminal device, to select, as the feedback resource, a PUCCH resource that matches the total quantity of bits of HARQ feedback information.

For example, the network device configures four PUCCH resources for the terminal device. If the total quantity of bits of HARQ feedback information is less than or equal to 2, a first PUCCH resource may be used as the feedback resource. If the total quantity of bits of HARQ feedback information is between 3 and N1, a second PUCCH resource is used as the feedback resource. If the total quantity of bits of HARQ feedback information is between N1 and N2, a third PUCCH resource is used as the feedback resource. If the total quantity of bits of HARQ feedback information is between N2 and N3, a fourth PUCCH resource is used as the feedback resource. 3<N1<N2<N3. Optionally, N1, N2, and N3 are indicated by configuration information sent by the network device, or are 1706 by default.

In addition, a semi-persistent scheduling SPS PDSCH may be a first SPS PDSCH scheduled by using the activation DCI, or may be an SPS PDSCH periodically transmitted in a periodicity P configured in SPS configuration information. Regardless of the first SPS PDSCH or a subsequent SPS PDSCH that is periodically transmitted and does not need to be scheduled by using the DCI, a slot in which HARQ feedback information corresponding to the SPS PDSCH is located is determined by using the parameter K1 indicated by the activation DCI. Details are not described herein again. In the semi-persistent scheduling manner, the first SPS PDSCH may be referred to as a PDSCH with scheduling information, and the subsequent PDSCH may be referred to as a PDSCH without scheduling information.

2.2. Dynamic Scheduling Manner

In the dynamic scheduling manner, one PDCCH schedules one PDSCH for transmission. Therefore, before each PDSCH is transmitted, the network device needs to send one PDCCH. That is, in the dynamic scheduling manner, each PDSCH is a PDSCH with scheduling information.

In this manner, DCI, for example, the foregoing activation DCI, may indicate a slot in which a scheduled PDSCH is located (for example, the foregoing parameter K0), and a start symbol S and a length L in the slot, and may further indicate a slot in which HARQ feedback information of the PDSCH is located (for example, the foregoing parameter K1). Details are not described herein again. In this manner, the HARQ feedback information and a feedback time unit are the same as those in the semi-persistent scheduling manner described in 1.1. Details are not described herein again. However, a manner of determining a feedback resource in the dynamic scheduling manner is different from that in the semi-persistent scheduling manner described in 1.1.

In the dynamic scheduling manner, after determining a total quantity of bits of HARQ feedback information that needs to be transmitted in the feedback time unit, the terminal device selects a PUCCH resource set based on the total quantity of bits; and selects a PUCCH resource from the PUCCH resource set as the feedback resource based on a PUCCH resource indicator (PRI) in the DCI.

For example, the network device configures K ($1 \le K \le 4$) PUCCH resource sets for the terminal device. Each PUCCH resource set may include a plurality of PUCCH resources and a resource list. The resource list is used to store IDs of the PUCCH resources. For example, when the total quantity of bits of HARQ feedback information is less than or equal to 2 bits, a first PUCCH resource set is selected. When 2 bits<Total quantity of bits of HARQ feedback information$\le N_1$ bits, a second PUCCH resource set is selected. When $N_1$ bits<Total quantity of bits of HARQ-ACK feedback information $\le N_2$ bits, a third PUCCH resource set is selected. When $N_2$ bits<Total quantity of bits of HARQ-ACK feedback information $\le N_3$ bits, a fourth PUCCH resource set is selected. Further, a PUCCH resource is selected from the selected PUCCH resource set as the feedback resource. Optionally, $N_1$, $N_2$, and $N_3$ are indicated by configuration information sent by the network device, or are 1706 by default.

3. Slot Configuration

Slot configuration information indicates which symbols are downlink symbols, which symbols are flexible symbols, and which symbols are uplink symbols in one slot. Alternatively, it is understood as that the slot configuration information indicates locations of uplink symbols, downlink symbols, and flexible symbols in one slot and a ratio. The uplink symbol is used to transmit uplink information, the downlink symbol is used to transmit downlink information, and the flexible symbol may be used to transmit the uplink information, or may be used to transmit the downlink information.

Figures 4, 5:
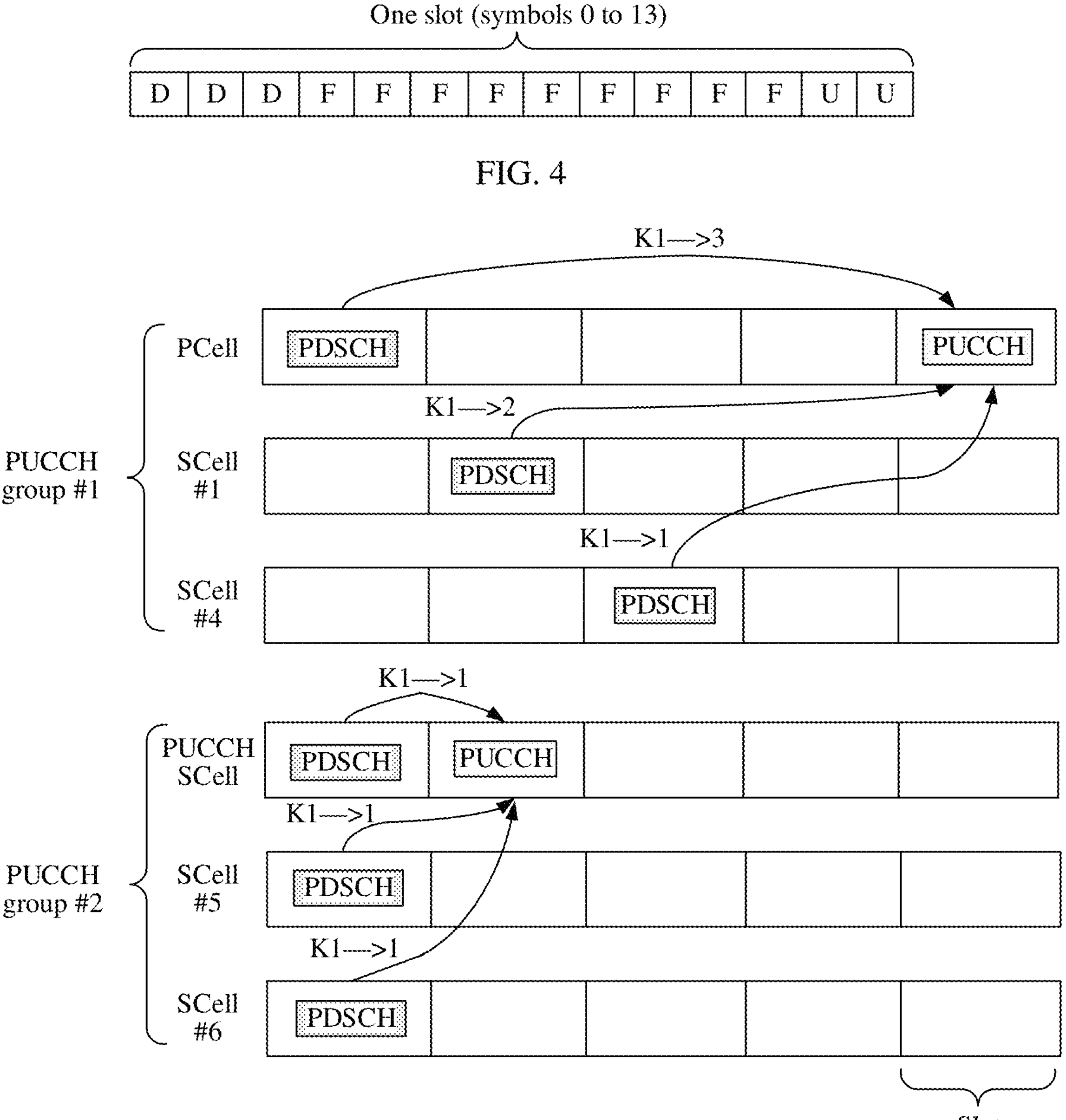
FIG. 4 is a schematic diagram of a structure of a downlink symbol, a flexible symbol, and an uplink symbol that are configured in a slot.
FIG. 5 is a schematic diagram of a method for transmitting feedback information of each PDSCH in carrier aggregation.

For example, as shown in FIG. 4, in a slot that may be configured by the network device, a symbol 0 to a symbol 2 are downlink symbols (marked as D), a symbol 3 to a symbol 11 are flexible symbols (marked as F), and a symbol 12 and a symbol 13 are uplink symbols (marked as U).

Optionally, if one of the following conflict cases occurs on a PUCCH resource on which HARQ feedback information is located, sending of the HARQ feedback information on the PUCCH resource is canceled.

Case (1): If the PUCCH resource overlaps a semi-static downlink symbol, in other words, the PUCCH resource corresponds to a semi-static downlink symbol, the sending of the HARQ feedback information on the PUCCH resource is canceled. For example, the PUCCH resource is the symbol 2 to the symbol 4, but the symbol 2 to the symbol 4 are configured as the downlink symbols in the semi-static manner in the foregoing Manner (1) or Manner (2).

Case (2): The PUCCH resource overlaps a dynamic downlink symbol or a downlink symbol in which a dynamically scheduled PDSCH is located.

Case (3): The PUCCH resource overlaps a semi-static flexible symbol, and an SFI is further configured for the terminal device. The flexible symbol is not configured as a dynamic uplink symbol by using the SFI.

In this case, the foregoing conflict case may also be referred to as that the PUCCH resource overlaps a downlink resource or a flexible resource in time domain. The downlink resource may include the downlink symbol, and the flexible resource may include the flexible symbol. Therefore, the conflict case may also be referred to as that the PUCCH resource overlaps the downlink symbol or the flexible symbol in time domain.

4. Carrier Aggregation (CA)

Downlink transmission may be performed by using a plurality of carriers through CA, to implement a large transmission bandwidth and improve a downlink transmission rate. In the CA, the terminal device may support a plurality of cells, and different cells may form a cell group, for example, a master cell group (MCG) and a secondary cell group (SCG). The MCG includes a plurality of cells. A cell used to initiate initial access may be referred to as a primary cell (PCell), and other cells are referred to as secondary cells (SCells). The PCell and the SCells in the MCG are combined through carrier aggregation. The SCG further includes a plurality of cells. The SCG also includes a cell similar to the PCell in the MCG, which is referred to as a primary secondary cell (PSCell). Similarly, the PSCell and SCells in the SCG may also be combined through carrier aggregation.

As described above, regardless of the semi-persistent scheduling manner or the dynamic scheduling manner, to ensure transmission reliability, the HARQ feedback information is sent according to the foregoing HARQ mechanism.

To determine a feedback time unit in which the HARQ feedback information is located and a feedback resource on which the HARQ feedback information is located, in addition to knowing a parameter K1 and a total quantity of bits of HARQ feedback information, the terminal device further needs to know a K1 set, an optional PUCCH resource set, and a PUCCH resource. The K1 set, the optional PUCCH resource set, and the PUCCH resource are notified to the terminal device by using PUCCH configuration information of a cell.

In an MCG, if no PUCCH SCell is configured, PUCCH configuration information is available only in a PCell. If an SCell is configured as a PUCCH SCell, PUCCH configuration information is also available in the PUCCH SCell. The PUCCH configuration information in the PCell may be different from that in the PUCCH SCell. Each piece of PUCCH configuration information includes the foregoing K1 set and the foregoing plurality of PUCCH resource sets. An SCG is similar to the MCG. PUCCH configuration information is available in a PSCell, or a PSCell and an SCell configured as a PUCCH SCell.

An MCG is used as an example. As shown in FIG. 5, there is PUCCH configuration information in a PCell and a PUCCH SCell. In the MCG, the PCell and some SCells perform HARQ feedback in the PCell, and the PCell and the some SCells (for example, an SCell #1 and an SCell #4) form a PUCCH group (a PUCCH group #1 shown in FIG. 5). Other SCells perform HARQ feedback in the PUCCH SCell, and the other SCells form another PUCCH group (for example, a PUCCH group #2 shown in FIG. 5). In FIG. 5, an example in which subcarrier spacings of the PCell, the SCell #1, the SCell #4, the SCell #5 and the SCell #6 are the same is used. If the subcarrier spacings are different, the terminal device needs to determine a feedback time unit (namely, a feedback slot) based on a slot corresponding to an end symbol of a PDSCH in the PCell or the PUCCH SCell and a K1 value indicated by a K1 indication field in DCI corresponding to the PDSCH in a configured K1 set.

In this embodiment of this application, the cell may be a logical concept, and may include one or more carriers, and the carrier may be a physical concept. Therefore, in this embodiment of this application, the cell may be replaced with the carrier, and multi-carrier aggregation may also be understood as coordination between a plurality of cells.

When the terminal device supports the carrier aggregation, HARQ feedback information of the plurality of cells can be transmitted only in the PCell or the PUCCH SCell. Consequently, resources for transmitting the HARQ feedback information in the PCell or the PUCCH SCell are insufficient. In addition, due to the slot configuration, the conflict cases described in the foregoing Case (1) to Case (3) occur, and the HARQ feedback information cannot be sent or is directly discarded. As a result, a success rate of transmitting the HARQ feedback information is low.

This application provides a feedback information transmission method 100. In the feedback information transmission method 100, a terminal device may send HARQ feedback information in a target time unit in a target cell through switching of a time domain and/or a frequency domain based on a one-to-one correspondence between reference time units indicated by first configuration information and cells configured to send the HARQ feedback information. Therefore, flexibility of a time-frequency resource for sending the HARQ feedback information is improved, and a success rate of transmitting the HARQ feedback information is improved.

This application further provides a feedback information transmission method 200. In the feedback information transmission method 200, when a first PUCCH resource overlaps a downlink symbol or a flexible symbol in time domain, HARQ feedback information is switched to another time unit for sending. This resolves low data transmission reliability because the HARQ feedback information cannot be sent and is discarded when the PUCCH resource overlaps the downlink symbol or the flexible symbol. Therefore, in the feedback information transmission method, a success rate of transmitting the HARQ feedback information can be improved. In other words, in the feedback information transmission method 200, when a resource conflict occurs on the first PUCCH resource, for example, the foregoing Case (1) to Case (3) occur, the HARQ feedback information may be switched to a following time unit for sending, or the HARQ feedback information may be switched to another cell for sending or another time unit of another cell for sending. This resolves a problem that the HARQ feedback information cannot be sent or is discarded because the PUCCH resource overlaps the downlink symbol or the flexible symbol, and improves the success rate of transmitting the HARQ feedback information.

The following describes in detail embodiments of this application with reference to the accompanying drawings.

Embodiment 1: Feedback Information Transmission Method 100

Figure 6:
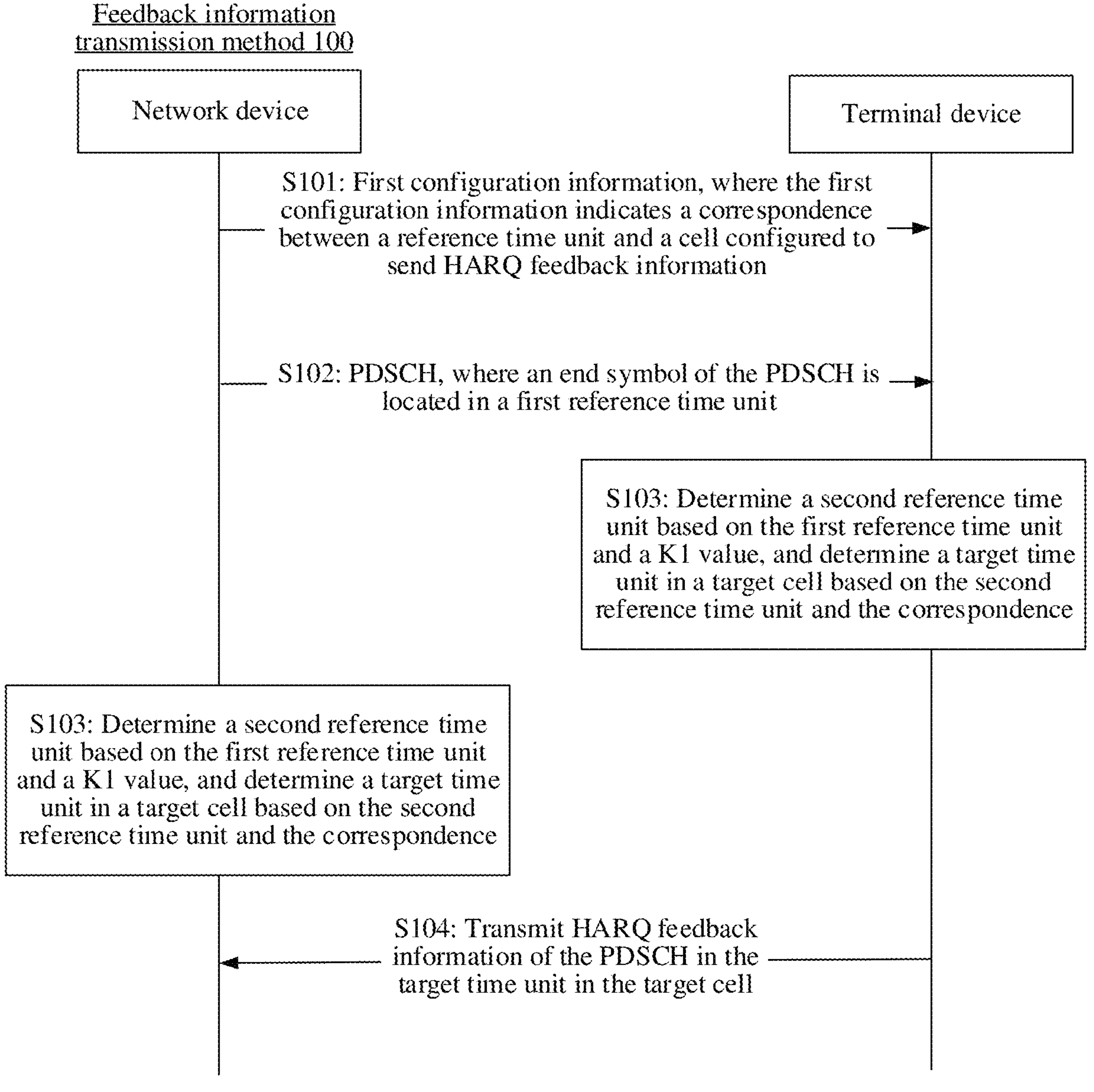
FIG. 6 is a schematic flowchart of a feedback information transmission method 100 according to an embodiment of this application.

FIG. 6 is a schematic flowchart of a feedback information transmission method according to an embodiment of this application. As shown in FIG. 6, the feedback information transmission method 100 includes but is not limited to the following steps.

S101: A network device sends first configuration information, where the first configuration information indicates a one-to-one correspondence between M reference time units and a plurality of cells configured to send hybrid automatic repeat request HARQ feedback information in the M reference time units. Correspondingly, a terminal device receives the first configuration information.

The one-to-one correspondence means that one of the M reference time units corresponds to one of the cells that are indicated by a base station and that are used to send the HARQ feedback information. For example, in the correspondence, if one reference time unit is a time unit #1, and the time unit #1 corresponds to an SCell #3 that is indicated by the base station and that is used to send the HARQ feedback information, in duration from a time domain start symbol of the time unit #1 to a time domain end symbol of the time unit #1, a cell used to send the feedback information is the SCell #3.

For ease of description, the "one-to-one correspondence" is briefly referred to as a "correspondence" in this specification. In addition, the plurality of cells configured to send the hybrid automatic repeat request HARQ feedback information in the M reference time units are briefly referred to as a plurality of cells.

Different reference time units in the M reference time units may correspond to a same cell, or may correspond to different cells. This is not limited in this application.

For example, Table 1 may be an example of the one-to-one correspondence. Indexes 0 to 4 respectively indicate five reference time units, and the plurality of cells in the one-to-one correspondence are respectively an SCell #1, an SCell #2, the SCell #3, and an SCell #4. Each of the five reference time units respectively corresponds to one of the four cells in the one-to-one correspondence. The index 0 and the index 3 separately indicate a same cell, and other indexes separately indicate different cells.

TABLE 1

| Reference time unit | Carrier |
|---|---|
| First time unit in a time domain sequence | SCell #3 |
| Second time unit in the time domain sequence | SCell #2 |
| Third time unit in the time domain sequence | SCell #1 |
| Fourth time unit in the time domain sequence | SCell #3 |
| Fifth time unit in the time domain sequence | SCell #4 |

Optionally, the first configuration information in the foregoing embodiment may be indicated by the base station to the terminal device by using a cell group configuration (CellGroupConfig) information element; or may be implicitly or explicitly indicated to the terminal device. The first configuration information may be explicitly indicated by using higher layer signaling, for example, RRC signaling.

Figure 7:
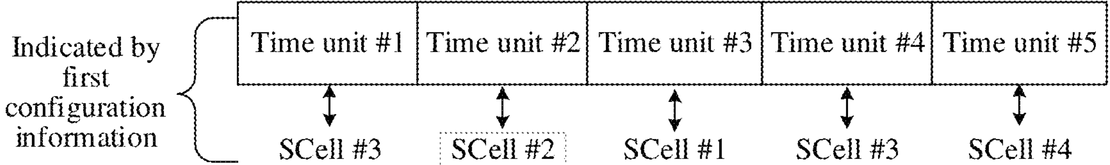
FIG. 7 is a schematic diagram of a first correspondence indicated by first configuration information according to an embodiment of this application.

In an optional manner, the first configuration information explicitly indicates the one-to-one correspondence between the M reference time units and the plurality of cells. In other words, the first configuration information includes information about the M reference time units, information about the plurality of cells, and information about the one-to-one correspondence. FIG. 7 shows an example of the first configuration information. In FIG. 7, in the duration from the time domain start symbol of the time unit #1 to the time domain end symbol of the time unit #1, a corresponding cell used to send the feedback information is the SCell #3, and so on. For example, in this manner, the first configuration information may include the information about the plurality of reference time units in a first column in Table 1, the information about the plurality of cells in a second column, and the correspondence between the information about the plurality of reference time units and the information about the plurality of cells.

In another optional manner, the first configuration information may not include the information about the M reference time units, and includes the information about the plurality of cells and the information about the one-to-one correspondence. In this case, the correspondence that is between the plurality of cells and the reference time units and that is indicated in the first configuration information may be predefined or preconfigured. For example, there is a one-to-one correspondence between the plurality of cells and the M reference time units that are arranged in a sequence of time domain locations, to obtain the one-to-one correspondence that is between the reference time units and the cells and that is indicated in the first configuration information. For example, Table 1 is an example of the first configuration information. In this case, the first configuration information may include the information about the plurality of cells in a right column in Table 1. Time units corresponding to the plurality of cells are predefined as the first time unit to the fifth time unit in a time domain sequence, so that the first configuration information implicitly indicates a one-to-one correspondence between the M time units and the plurality of cells.

Optionally, the first configuration information may alternatively be in another form, so that the terminal device obtains a correspondence indicated by the first configuration information. This is not limited in this application.

Time domain lengths of the M reference time units are the same, and the time domain lengths of the reference time units are determined based on a first subcarrier spacing. An optional implementation of the first subcarrier spacing may include but is not limited to the following implementations.

S102: The network device sends a PDSCH. Correspondingly, the terminal device receives the PDSCH.

An end symbol of the PDSCH is located in the first reference time unit in the M reference time units.

Optionally, the first reference time unit is a reference time unit in which the end symbol of the PDSCH is located. When a subcarrier spacing of a cell in which the PDSCH is located is equal to the first subcarrier spacing, because the reference time unit and a time unit in the cell in which the PDSCH is located have a same time domain length, the first reference time unit may be represented as a time unit in which the end symbol of the PDSCH is located. When a subcarrier spacing of a cell in which the PDSCH is located is not equal to the first subcarrier spacing, because the reference time unit and a time unit in the cell in which the PDSCH is located have different time domain lengths, the first reference time unit is represented as a reference time unit in which the end symbol of the PDSCH is located.

Optionally, the network device may send DCI before S102. The DCI may dynamically schedule a PDSCH, or is used to activate an SPS PDSCH of the foregoing SPS configuration information. Correspondingly, before step S102, the terminal device may receive the DCI, and receive a corresponding PDSCH based on the DCI.

S103: The network device determines a second reference time unit in the M reference time units based on the first reference time unit, and determines a target time unit in a target cell based on the second reference time unit and the correspondence. Correspondingly, the terminal device also determines the second reference time unit in the M reference time units based on the first reference time unit, and determines the target time unit in the target cell based on the second reference time unit and the correspondence.

The second reference time unit is after the first reference time unit, and the second reference time unit and the first reference time unit are separated by K1 reference time units, where K1 is an integer greater than or equal to 0. Optionally, if the first subcarrier spacing is the same as the subcarrier spacing of the cell in which the PDSCH is located, that is, the reference time unit and the time unit in which the PDSCH is located have the same time domain length, the second reference time unit may be represented as a time unit that is separated from the time unit in which the PDSCH is located by the K1 time units.

K1 is indicated by the DCI for scheduling the PDSCH, and K1 is a value in a K1 set, and as described above, is determined with reference to the K1 set. In this application, an optional implementation of the K1 set may include but is not limited to the following implementations. The K1 value may be an integer greater than or equal to 0. For example, if the K1 value is equal to 0, the second reference time unit and the first reference time unit are a same time unit. If the K1 value is equal to 1, the second reference time unit is an adjacent reference time unit behind the first reference time unit. If the K1 value is equal to 2, the second reference time unit is a reference time unit identified by an index obtained by adding 2 to an index of the first reference time unit, where an index of the second reference time unit is equal to the obtained index.

The target cell is a cell corresponding to the second reference time unit in the correspondence indicated by the first configuration information, and the target time unit is a time unit that is in the target cell and that overlaps the second reference time unit in time domain. Optionally, if the first subcarrier spacing is the same as the subcarrier spacing of the cell in which the PDSCH is located, the target time unit is a time unit that is in the target cell and that is separated from the time unit in which the PDSCH is located by K1 time units.

In an optional implementation, if there are a plurality of time units in the target cell that overlap the second reference time unit in time domain, the target time unit is a time unit at a foremost time domain location in time units that are in the target cell and that overlap the second reference time unit in time domain. In this implementation, a feedback delay is reduced.

In another optional implementation, if there are a plurality of time units in the target cell that overlap the second reference time unit in time domain, the target time unit is a time unit at a rearmost time domain location in time units that are in the target cell and that overlap the second reference time unit in time domain. In this implementation, the target time unit can be located as late as possible in time domain. This avoids that the terminal device discards the feedback information due to an insufficient data processing capability, and improves a success rate of sending the feedback information.

S104: The terminal device sends the HARQ feedback information of the PDSCH in the target time unit in the target cell. Correspondingly, the network device receives the HARQ feedback information for the PDSCH in the target time unit in the target cell.

It can be learned that, in the feedback information transmission method, based on the correspondence that is between the reference time units and the cells and that is indicated by the first configuration information, the HARQ feedback information may be switched to one target cell for sending, which is not limited to a primary cell PCell or a PUCCH SCell for sending, so that a success rate of transmitting the HARQ feedback information can be improved. In other words, in the feedback information transmission method, a rule for switching HARQ feedback information in time domain and/or frequency domain may be specified, so that the terminal device and the network device can align the target time unit and the target cell in which the HARQ feedback information is transmitted, thereby improving a success rate of transmitting the HARQ feedback information, and improving communication reliability.

In the feedback information transmission method 100 shown in FIG. 6, because the plurality of cells indicated by the first configuration information respectively correspond to different subcarrier spacings, this application provides the following several optional solutions for determining the first subcarrier spacing.

Implementation 1.1: The first subcarrier spacing is configured by the network device, and is used to determine the time domain length of the reference time unit.

In this way, the network device can adjust the time domain length of the reference time unit in time based on system load and a channel status by using the first subcarrier spacing, to flexibly configure a relationship between a feedback delay and a feedback success rate.

Figure 8:
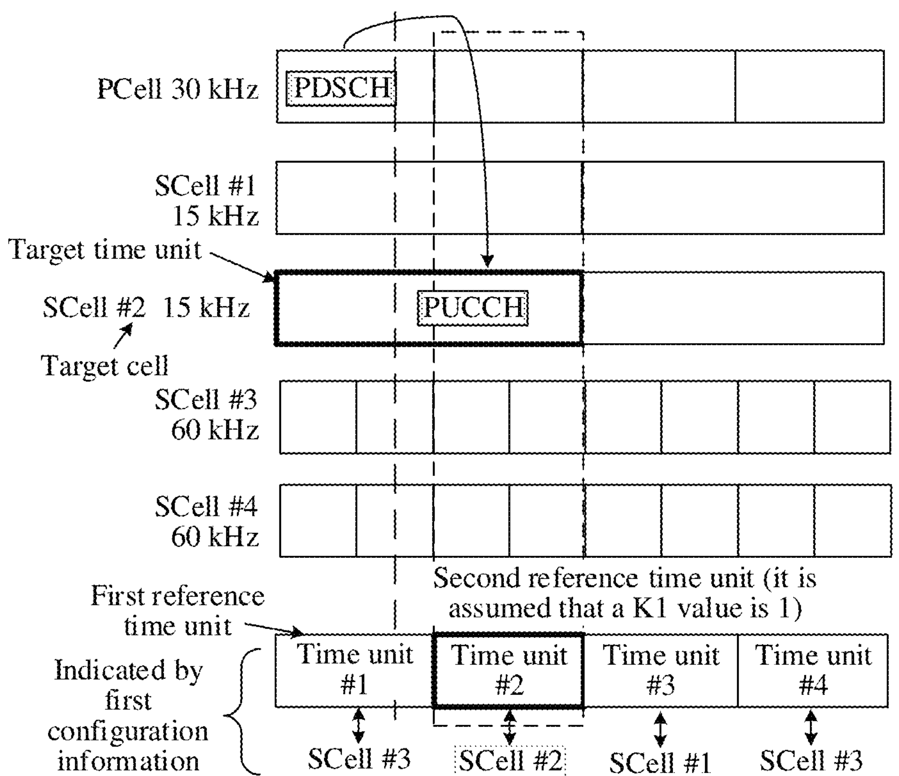
FIG. 8 is a schematic diagram of an example of a feedback information transmission method 100 according to an embodiment of this application.

For example, it is assumed that the first subcarrier spacing configured by the network device is 30 kHz, and the plurality of cells configured to send the HARQ feedback information are a PCell, an SCell #1, an SCell #2, an SCell #3 and an SCell #4 respectively. Subcarrier spacings respectively corresponding to the plurality of cells are shown in FIG. 8. Assuming that a PDSCH is located in the PCell, a reference time unit in which an end symbol of the PDSCH is located is a time unit #1 shown in FIG. 8. Assuming that a K1 indication field in DCI for scheduling the PDSCH is 00, and a used K1 set is {1, 2, 3, 4}, a K1 value is 1. Therefore, a second reference time unit is a time unit separated from the first reference time unit by one reference time unit, namely, a time unit #2 shown in FIG. 8. Based on a correspondence shown in FIG. 8 and indicated by first configuration information, a target cell is the SCell #2 corresponding to the second reference time unit, namely, the time unit #2. A target time unit is a time unit that is in the SCell #2 and that overlaps the time unit #2 in time domain, for example, a target time unit shown in FIG. 8. Therefore, the terminal device may send the HARQ feedback information in the target time unit in the SCell #2, for indicating a receiving status of the PDSCH.

The terminal device may determine a PUCCH resource in the target time unit in a semi-persistent scheduling manner or a dynamic scheduling manner, to send the HARQ feedback information. For example, the PUCCH resource in which the HARQ feedback information is located is a PUCCH in the target time unit shown in FIG. 8.

It can be learned that, in the feedback information transmission method, based on the first configuration information, the HARQ feedback information of the PDSCH may be switched to the time unit of the SCell #2 for sending. This resolves a low success rate of transmitting the HARQ feedback information because the HARQ feedback information can be sent only in the PCell or the PUCCH SCell.

Optionally, if a subcarrier spacing corresponding to a cell that sends the PDSCH is equal to the first subcarrier spacing, a reference time unit in the correspondence indicated by the first configuration information is a time unit in the cell, and the first reference time unit is a time unit in which the end symbol of the PDSCH is located, and is briefly referred to as a first time unit. The second reference time unit is a time unit that is separated from the time unit in which the end symbol of the PDSCH is located by K1 time units, and is briefly referred to as a second time unit. The target cell is a cell corresponding to the second time unit in the correspondence. The target time unit is a time unit that is in the target cell and that overlaps the second time unit in time domain.

Figures 9, 10:
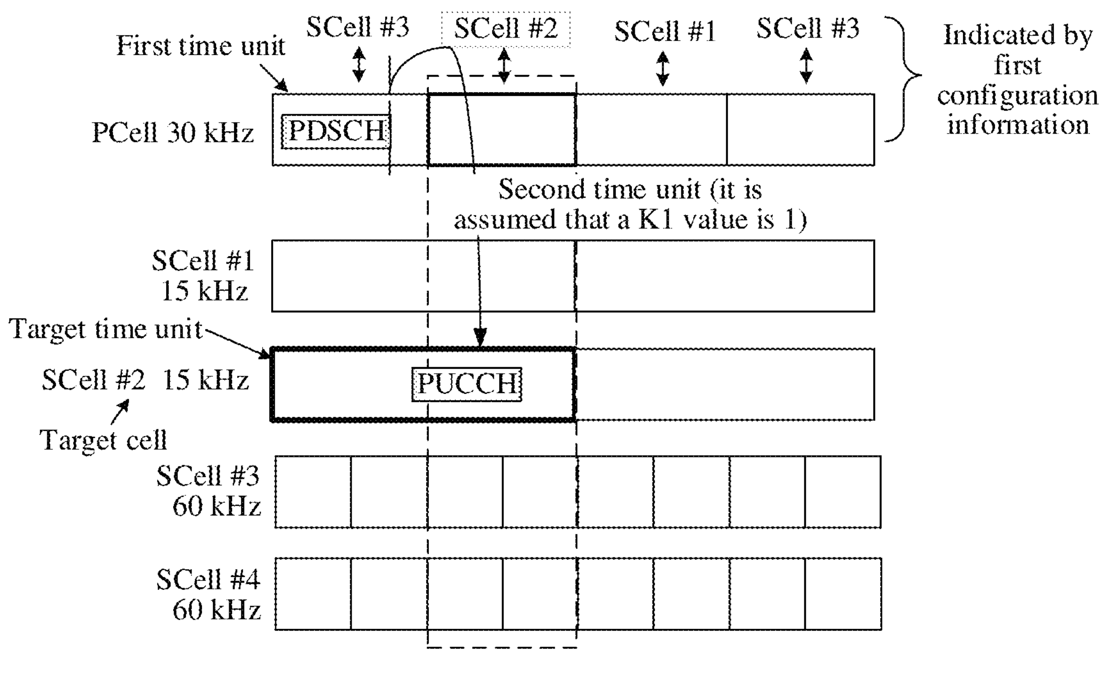
FIG. 9 is a schematic diagram of another example of a feedback information transmission method 100 according to an embodiment of this application.
FIG. 10 is a schematic diagram of still another example of a feedback information transmission method 100 according to an embodiment of this application.

Therefore, if the subcarrier spacing corresponding to the cell that sends the PDSCH is equal to the first subcarrier spacing, a schematic diagram of a feedback information transmission method is shown in FIG. 9. The terminal device may determine a second time unit that is separated from a time unit in which an end symbol of a PDSCH is located by K1 time units, determine, based on first configuration information, a target cell corresponding to the second time unit, namely, an SCell #2, and further determine a time unit that is in the SCell #2 and that overlaps the second time unit in time domain, namely, a time unit shown by using a thick block in the SCell #2 shown in FIG. 9. Therefore, a PUCCH resource is determined in the time unit according to the foregoing method, to send HARQ feedback information of the PDSCH.

It can be learned that, based on the schematic diagrams shown in FIG. 8 and FIG. 9, specific operation steps of determining, by the terminal device, the target cell and the target time unit based on the first configuration information and the first reference time unit are not unique. For example, the first reference time unit and the second reference time unit shown in FIG. 8 are described by using the time domain length of the time unit corresponding to the first subcarrier spacing as a granularity. Because the first subcarrier spacing is equal to the subcarrier spacing of the cell in which the PDSCH is located, the first time unit and the second time unit shown in FIG. 9 are described by using the time domain length of the time unit in the cell in which the PDSCH is located as a granularity. Consequently, a specific operation process in which the terminal device or the network device determines the target cell and the target time unit is not limited in this application.

Implementation 1.2: The first subcarrier spacing is a smallest subcarrier spacing in subcarrier spacings corresponding to the plurality of cells.

Compared with a time domain length that is of a subcarrier spacing and that is used during feedback limited to a PCell or a PUCCH SCell, a time domain length that is of a reference time unit and that is determined in this implementation is a largest time domain length corresponding to the plurality of cells, so that a moment at which channel quality is good is selected from long time domain duration to feed back HARQ feedback information of a PDSCH, thereby improving a success rate of transmitting the feedback information.

For example, as shown in FIG. 10, a plurality of cells configured to send HARQ feedback information is the PCell, the SCell #1, the SCell #2, the SCell #3 and the SCell #4 shown in FIG. 8 or FIG. 9. A K1 indication field in DCI is 00, and a used K1 set is {1, 2, 3, 4}. A smallest subcarrier spacing in subcarrier spacings respectively corresponding to the PCell, the SCell #1, the SCell #2, the SCell #3, and the SCell #4 is a subcarrier spacing 15 kHz corresponding to the SCell #1 or the SCell #2. Therefore, a first subcarrier spacing is 15 kHz. As shown in FIG. 10, time domain lengths of reference time units are the same as a time domain length of one slot in the SCell #1 or the SCell #2. In a correspondence indicated by first configuration information, the reference time units are a time unit #1 and a time unit #2, and corresponding cells are the SCell #3 and the PCell respectively. As shown in FIG. 10, a PDSCH is a PDSCH in the PCell, a K1 value is 1, a first reference time unit determined by the terminal device is the time unit #1, a second reference time unit is the time unit #2, a target cell is the PCell, and a time unit that is in the PCell and that overlaps the time unit #2 in time domain is two time units in a thick block in the PCell shown in FIG. 10.

In the foregoing optional implementation, when there are a plurality of time units in the target cell that overlap the second reference time unit in time domain, the terminal device and the network device may agree on using a time unit at a foremost time domain location as a target time unit, or the terminal device and the network device may agree on using a time unit at a rearmost time domain location as a target time unit. In the schematic diagram shown in FIG. 10, assuming that the time unit at the foremost time domain location is agreed to be used as the target time unit, the target time unit is the time unit at the foremost time domain location in a thick block in the PCell shown in FIG. 10, namely, a time unit in which a PUCCH resource is located.

Implementation 1.3: The first subcarrier spacing is a largest subcarrier spacing in subcarrier spacings corresponding to the plurality of cells.

Compared with a time domain length that is of a subcarrier spacing and that is used for feedback limited to a PCell or a PUCCH SCell, the time domain length that is of the reference time unit and that is determined in this implementation has a smallest value in time domain lengths of time units corresponding to the plurality of cells, so that a feedback delay is reduced.

Figure 11:
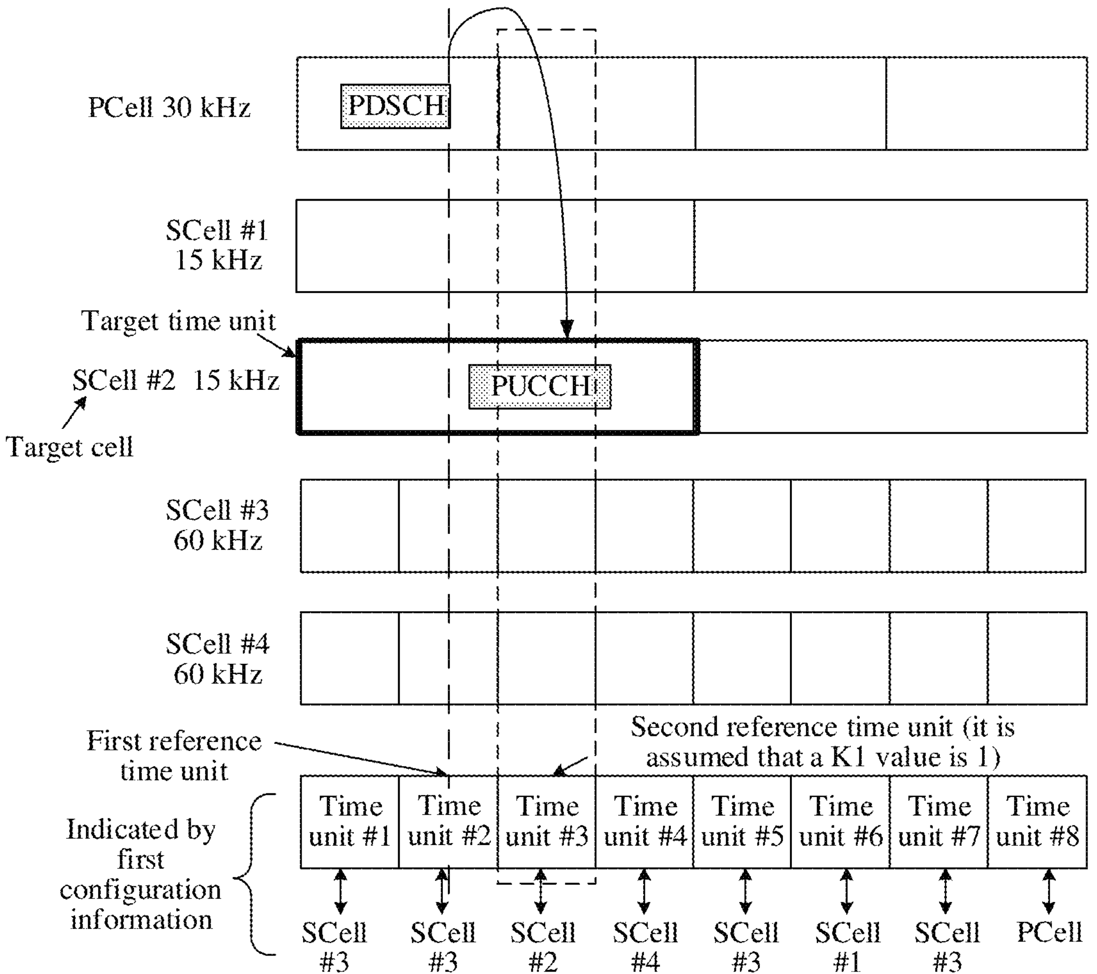
FIG. 11 is a schematic diagram of yet another example of a feedback information transmission method 100 according to an embodiment of this application.

For example, as shown in FIG. 11, a plurality of cells configured to send HARQ feedback information is the PCell, the SCell #1, the SCell #2, the SCell #3 and the SCell #4 shown in FIG. 8 or FIG. 9. It is assumed that a K1 indication field in DCI is 00, and a used K1 set is {1, 2, 3, 4}. A largest subcarrier spacing in subcarrier spacings respectively corresponding to the PCell, the SCell #1, the SCell #2, the SCell #3 and the SCell #4 is a subcarrier spacing 60 kHz in the SCell #3 or the SCell #4. Therefore, a first subcarrier spacing is 60 kHz. As shown in FIG. 11, time domain lengths of reference time units are the same as a time domain length of one slot in the SCell #3 or the SCell #4. In a correspondence indicated by first configuration information, the reference time units are a time unit #1 to a time unit #8, and respective corresponding cells are the SCell #3, the SCell #3, the SCell #2, the SCell #4, the SCell #3, the SCell #1, the SCell #3, and the PCell respectively. As shown in FIG. 11, assuming that a PDSCH is a PDSCH in the PCell, and a K1 value is 1, a first reference time unit determined by the terminal device is the time unit #2, a second reference time unit is the time unit #3, a target cell is the SCell #2, and a target time unit is a time unit in a thick block in the SCell #2 shown in FIG. 11.

In still another optional implementation, the first subcarrier spacing is predefined. In this way, resource overheads required for configuration and complexity are reduced.

It should be noted that the correspondences indicated by the first configuration information shown in FIG. 7 and FIG. 8 to FIG. 11 are described for ease of understanding. The reference time unit may be the time unit in the cell corresponding to the first subcarrier spacing, and the first configuration information may be but is not limited to information in the manners shown in Table 1 and FIG. 7. The terminal device obtains the correspondence based on the first subcarrier spacing and the first configuration information.

K1 is indicated by the downlink control information DCI for scheduling the PDSCH, and K1 is a value in a K1 set. Because the cell in which the HARQ feedback information is transmitted is no longer limited to the PCell or the PUCCH SCell, how the terminal device knows the K1 set used in the feedback information transmission method is also a problem that needs to be resolved. The following describes possible implementations.

Implementation 2.1: The K1 set is a K1 set configured for a cell in which the PDSCH is located. In this way, considering a feedback delay required for the PDSCH of the cell and/or an uplink transmission capability of the terminal device, a feedback time unit is determined based on the K1 set.

Implementation 2.2: The K1 set is a K1 set configured for a primary cell accessed by the terminal device. In this way, considering a feedback delay required for the PDSCH of the primary cell and/or an uplink transmission capability of the terminal device, a feedback time unit is determined based on the K1 set.

Implementation 2.3: The K1 set is a K1 set configured for a cell with the smallest subcarrier spacing in the plurality of cells. In this way, with reference to a feedback delay required for the PDSCH of the cell with the smallest subcarrier spacing, a feedback time unit may be determined based on the K1 set.

In another optional implementation, when there are a plurality of cells with a smallest subcarrier spacing in the plurality of cells, the K1 set is a K1 set configured for a cell with a smallest or largest index in the cells with the smallest subcarrier spacing in the plurality of cells, so that when there are the plurality of cells with the smallest subcarrier spacing in the plurality of cells, the network device and the terminal device use the aligned K1 set.

Implementation 2.4: The K1 set is a K1 set configured for a cell with the largest subcarrier spacing in the plurality of cells. In this way, with reference to a feedback delay required for the PDSCH of the cell with the largest subcarrier spacing, a feedback time unit may be determined based on the K1 set.

In another optional implementation, when there are a plurality of cells with a largest subcarrier spacing in the plurality of cells, the K1 set is a K1 set configured for a cell with a smallest or largest index in the cells with the largest subcarrier spacing in the plurality of cells, so that when there are the plurality of cells with the largest subcarrier spacing in the plurality of cells, the network device and the terminal device use the aligned K1 set.

Implementation 2.5: The K1 set is a K1 set associated with the first configuration information configured by the network device. In this way, the network device adjusts a relationship between a feedback delay and resource overheads in time based on system load and a requirement by using the K1 set associated with the first configuration information.

Implementation 2.6: The K1 set is a K1 set associated with the predefined first configuration information. In this way, resource overheads required for configuration and complexity are reduced.

In the foregoing optional Implementations 2.1 to 2.6, the K1 set is not limited to the K1 set configured for the PCell or the PUCCH SCell, so that flexibility of transmitting the HARQ feedback information can be further improved.

Embodiment 2: Feedback Information Transmission Method 200

When a time-frequency resource used to send HARQ feedback information is determined, if the time-frequency resource used to send the HARQ feedback information is unavailable, for example, the time-frequency resource used to send the HARQ feedback information conflicts with a time domain resource occupied by another to-be-sent information in time domain, or overlaps a downlink symbol or a flexible symbol, to send the HARQ feedback information, this application provides a feedback information transmission method if the time-frequency resource used to send the HARQ feedback information is re-determined. That is, when a first PUCCH resource used to send the HARQ feedback information overlaps the downlink symbol or the flexible symbol in time domain, how to transmit the HARQ feedback information of a PDSCH needs to be resolved. The following describes the feedback information transmission method 200 with reference to the accompanying drawings.

Figure 12:
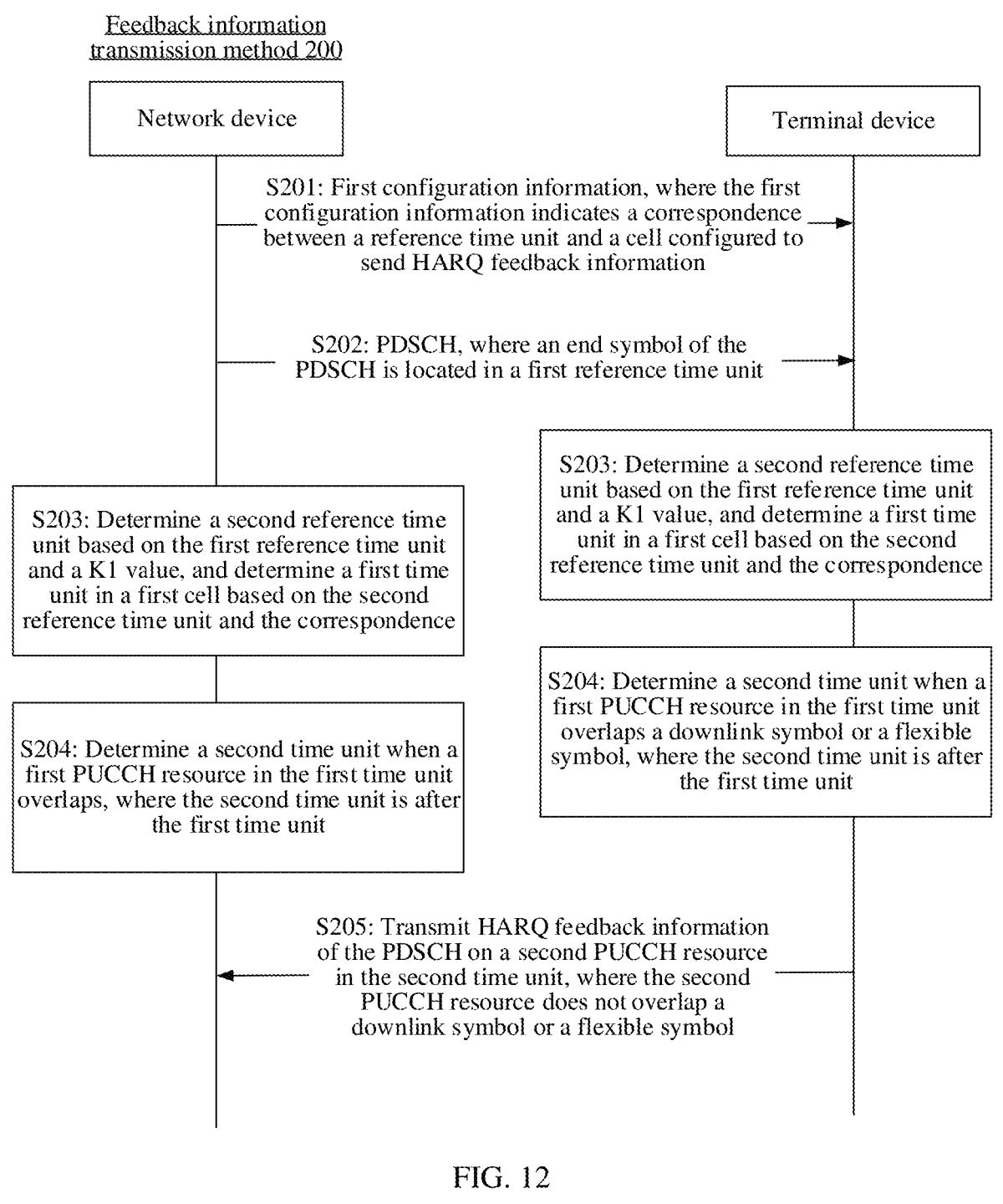

FIG. 12 is a schematic flowchart of a feedback information transmission method 200 according to an embodiment of this application. As shown in FIG. 12, the feedback information transmission method 200 includes but is not limited to the following steps.

S201: A network device sends first configuration information, where the first configuration information indicates a correspondence between M reference time units and a plurality of cells configured to send hybrid automatic repeat request HARQ feedback information in the M reference time units. Correspondingly, a terminal device receives the first configuration information.

S202: The network device sends a PDSCH. Correspondingly, the terminal device receives the PDSCH.

S203: The network device determines a second reference time unit in the M reference time units based on a first reference time unit, and determines a first time unit in a first cell based on the second reference time unit and the correspondence. Correspondingly, the terminal device also determines the second reference time unit in the M reference time units based on the first reference time unit, and determines the first time unit in the first cell based on the second reference time unit and the correspondence.

For related descriptions of steps S201 to S203, refer to related content in the feedback information transmission method 100. Details are not described herein again. For example, for determining of the first cell and the first time unit in step S203, refer to related content of the target cell and the target time unit in the feedback information transmission method 100. Details are not described herein again.

When a first PUCCH resource used to transmit HARQ feedback information of the PDSCH overlaps a downlink symbol or a flexible symbol in time domain, steps S204 and S205 may be performed. The first PUCCH resource is a PUCCH resource that is in the first cell, is located in the first time unit, and is configured to carry the HARQ feedback information of the PDSCH.

S204: The terminal device determines a second time unit. Correspondingly, the network device also determines the second time unit. The second time unit is after the first time unit.

S205: The terminal device sends the HARQ feedback information of the PDSCH on a second PUCCH resource in the second time unit. Correspondingly, the network device receives the HARQ feedback information of the PDSCH on the second PUCCH resource in the second time unit. The second PUCCH resource does not overlap a downlink symbol or a flexible symbol in time domain.

Optionally, in the feedback information transmission method 200, a first subcarrier spacing may be known in the manners described in Implementation 1.1 to Implementation 1.3 described in the feedback information transmission method 100; and/or in the feedback information transmission method 200, a required K1 set may be known in the manners described in Implementation 2.1 to Implementation 2.6 described in the feedback information transmission method 100. Therefore, in the feedback information transmission method 200, flexibility, a success rate, and the like of transmitting the HARQ feedback information can be further improved.

Optionally, for the feedback information transmission method 200, the first subcarrier spacing may be a subcarrier spacing corresponding to a default cell, and/or the K1 set is a K1 set configured for the default cell. The default cell may be predefined or preconfigured. Alternatively, the default cell may be a PCell, a PUCCH SCell, or another specified cell.

It can be learned that when the first PUCCH resource overlaps the downlink symbol or the flexible symbol in time domain, the terminal device may switch the HARQ feedback information to another time unit for sending. This resolves low data transmission reliability because the HARQ feedback information cannot be sent and is discarded when the first PUCCH resource overlaps the downlink symbol or the flexible symbol. Therefore, in the feedback information transmission method 200, a success rate of transmitting the HARQ feedback information can be improved. In an optional implementation, the second time unit is a time unit in a second cell. The second cell is the first cell, or a cell other than the first cell in the plurality of cells. It can be learned that, in the feedback information transmission method 200, the HARQ feedback information is transmitted in time through switching between the time domains or switching of the time domain and a frequency domain. This avoids that the HARQ feedback information cannot be sent or is discarded because the PUCCH resource overlaps the downlink symbol or the flexible symbol, and improves a success rate of transmitting the HARQ feedback information.

Figure 13:
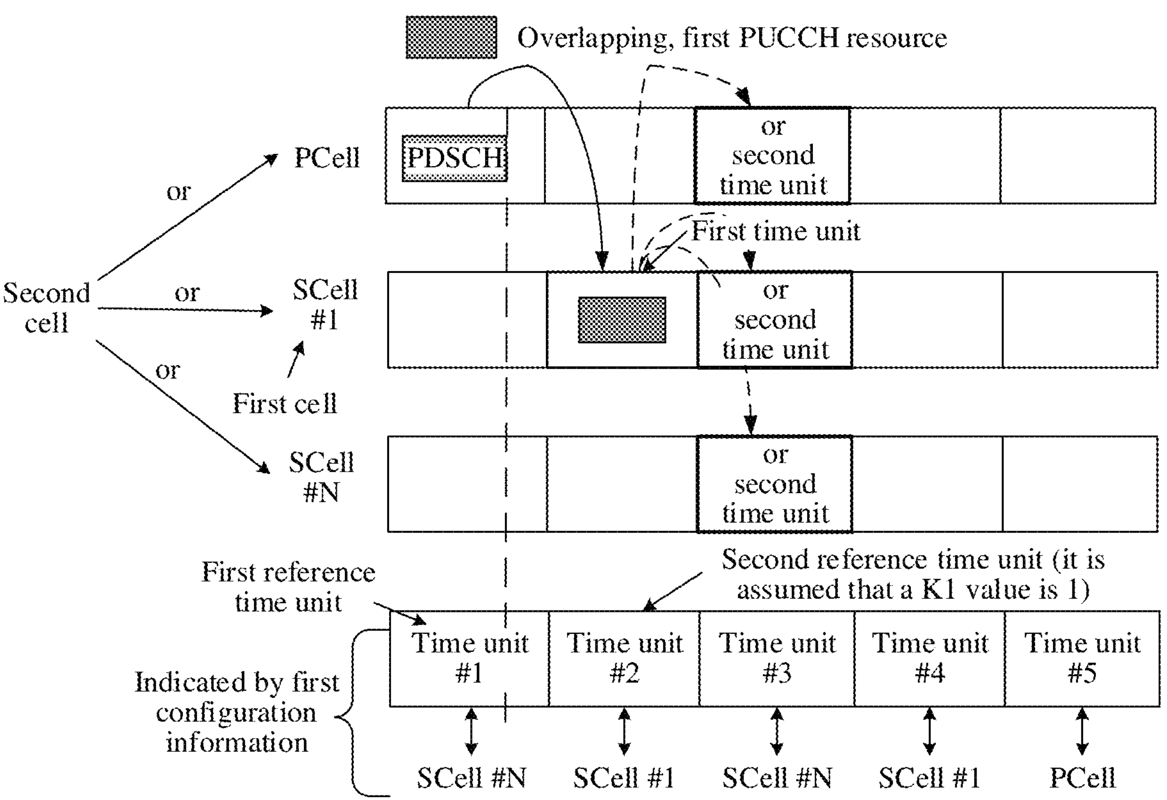
FIG. 13 is a schematic diagram of an example of a feedback information transmission method 200 according to an embodiment of this application.

For example, FIG. 13 is a schematic diagram of a feedback information transmission method 200. It is assumed that a plurality of cells configured to send HARQ feedback information is a PCell, an SCell #1, and an SCell #N. It is assumed that subcarrier spacings respectively corresponding to the PCell, the SCell #1, and the SCell #N are equal, and the subcarrier spacing is a first subcarrier spacing. A correspondence indicated by first configuration information may be shown in FIG. 13. There is a one-to-one correspondence between a time unit #1 to a time unit #5 and the SCell #N, the SCell #1, the SCell #N, the SCell #1 and the PCell. As shown in FIG. 13, a PDSCH is in the PCell, and a first reference time unit is a time unit in which an end symbol of the PDSCH is located, namely, the time unit #1. Assumed that a used K1 set is a K1 set configured for the PCell, and a K1 value determined based on the K1 set is 1, a second reference time unit is the time unit #2. In this way, a first cell is the SCell #1, and a first time unit is a time unit shown by using a thick box in the SCell #1. If a first PUCCH resource determined by the terminal device in the first time unit shown by using the thick box in the SCell #1 overlaps a downlink symbol or a flexible symbol in time domain, the second time unit may be a time unit behind the time unit shown by using the thick box. As shown in FIG. 13, the second cell may be the first cell, namely, the SCell #1, the PCell, the SCell #N, or the like. Therefore, as shown in FIG. 13, the second time unit may be one of the second time units shown by using the thick boxes. A PUCCH resource determined in each second time unit shown by using the thick box does not overlap a downlink symbol or a flexible symbol in time domain. It can be learned that in this implementation, when the first PUCCH resource overlaps the downlink symbol or the flexible symbol, the HARQ feedback information may be switched to another time unit or another time unit of another cell for sending, so that flexibility and a success rate of transmitting the HARQ feedback information are improved.

The following separately describes possible implementations of the second cell, the second time unit, and the second PUCCH resource in Implementation 3.1 to Implementation 3.3. The second PUCCH resource is a candidate PUCCH resource in the second cell in the second time unit. For determining of the candidate PUCCH resource, refer to the foregoing related content. Details are not described herein again.

Implementation 3.1: The second cell is a cell corresponding to a third reference time unit in M reference time units in a one-to-one correspondence, the second time unit is a time unit that is in the second cell and that overlaps the third reference time unit in time domain, and the second PUCCH resource is a candidate PUCCH resource in the second time unit.

The third reference time unit is an earliest available reference time unit in time domain in at least one available reference time unit. Each of the at least one available reference time unit is after the second reference time unit, a cell corresponding to each available reference time unit in the correspondence is an available candidate cell, a candidate PUCCH resource in a third time unit in the available candidate cell does not overlap a downlink symbol or a flexible symbol, and the third time unit is a time unit that is in the available candidate cell and that overlaps the reference time unit corresponding to the available candidate cell in the one-to-one correspondence.

In other words, the available reference time unit needs to meet the following conditions. (1) The available reference time unit is after the second reference time unit. (2) The corresponding cell in the correspondence is the available candidate cell. (3) The candidate PUCCH resource in the third time unit in the available candidate cell does not overlap the downlink symbol and the flexible symbol, and the third time unit is the time unit that is in the available candidate cell and that overlaps the reference time unit corresponding to the available candidate cell in time domain. For determining of the candidate PUCCH resource, refer to the foregoing related content. Details are not described herein again.

Figure 14:
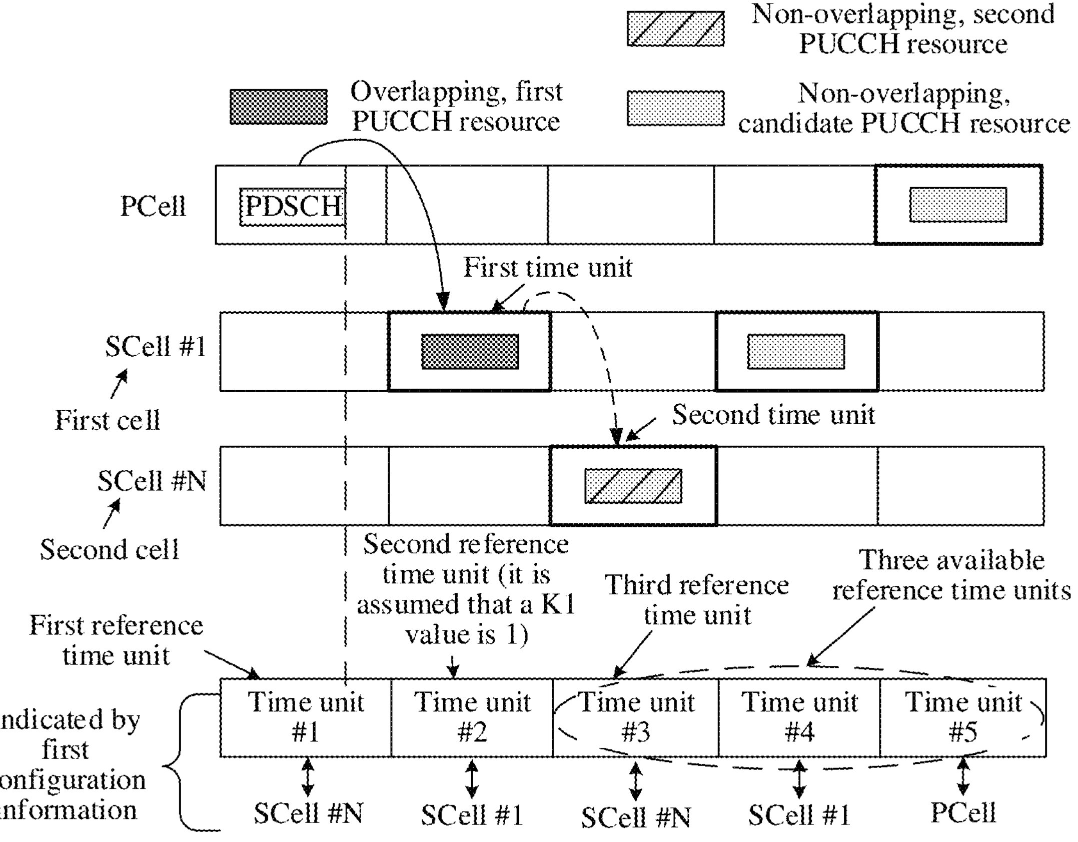
FIG. 14 is a schematic diagram of another example of a feedback information transmission method 200 according to an embodiment of this application.

For example, as shown in FIG. 14, assuming that a first reference time unit is a time unit #1, and a second reference time unit is a time unit #2, in time units indicated by first configuration information, a time unit #3 to a time unit #5 are located behind the time unit #2. A time unit that is in an available candidate cell SCell #N corresponding to the time unit #3 and that overlaps the time unit #3 in time domain is a time unit shown by using a thick dashed-line box in the SCell #N. Assuming that a candidate PUCCH resource in the time unit shown by using the thick dashed-line box in the SCell #N does not overlap a downlink symbol and a flexible symbol, the time unit #3 is an available reference time unit. Similarly, a time unit that is in an SCell #1 corresponding to the time unit #4 and that overlaps the time unit #4 is a time unit shown by using a thick dashed-line box in the SCell #1. Assuming that a candidate PUCCH resource in the time unit shown by using the thick dashed-line box in the SCell #1 does not overlap a downlink symbol and a flexible symbol, the time unit #4 is also an available reference time unit. Similarly, a time unit that is in a PCell corresponding to the time unit #5 and that overlaps the time unit #5 is a time unit shown by using a thick dashed-line box in the PCell. Assuming that a candidate PUCCH resource in the time unit shown by using the thick dashed-line box in the PCell does not overlap a downlink symbol and a flexible symbol, the time unit #5 is also an available reference time unit. The candidate PUCCH resources in the three available reference time units are gray padding blocks in the thick dashed-line box shown in FIG. 14.

An earliest available reference time unit in the three available reference time units in time domain is the time unit #3, that is, a third reference time unit is the time unit #3. In this case, a second cell is the SCell #N corresponding to the time unit 3 #, a second time unit is the time unit that is in the SCell #N and that overlaps the time unit #3 in time domain, and a second PUCCH resource is shown by using a gray padding block with stripes in the time unit.

It should be noted that FIG. 14 is described by using an example in which subcarrier spacings respectively corresponding to a plurality of cells are the same. When the subcarrier spacings are different, a time unit for sending HARQ feedback information is still a time unit that is in a cell corresponding to a third reference time unit in a one-to-one correspondence and that overlaps the third reference time unit in time domain. Optionally, assuming that there are a plurality of time units in the cell that overlap the third reference time unit in time domain, as described in the foregoing optional implementation, the HARQ feedback information may be sent in a time unit at a foremost time domain location, namely, a feedback time unit. For details, refer to the method for determining the target time unit shown in FIG. 9 or FIG. 11 in Embodiment 1. Details are not described herein again.

Optionally, as shown in FIG. 14, assuming that a candidate PUCCH resource corresponding to a time unit #3 overlaps a downlink symbol or a flexible symbol in time domain, the time unit #3 is not an available reference time unit. Correspondingly, an available reference time unit at a foremost time domain location is a time unit #4 instead of the time unit #3.

It can be learned that in this implementation, at least one available reference time unit may be determined based on the correspondence indicated by the first configuration information, and an earliest available reference time unit in time domain is selected from the at least one available reference time unit, to obtain the second cell, the second time unit, and the second PUCCH resource for sending the HARQ feedback information. Therefore, this avoids a problem that the HARQ feedback information cannot be sent when the first PUCCH resource overlaps the downlink symbol or the flexible symbol, and greatly improves a success rate of transmitting the HARQ feedback information.

Implementation 3.2: The second cell is a default cell, and the second time unit is an earliest available time unit in time domain in at least one available time unit in the second cell. A candidate PUCCH resource in each of the at least one available time unit does not overlap a downlink symbol or a flexible symbol.

The default cell may be predefined or preconfigured. Alternatively, the default cell may be a PCell, a PUCCH SCell, or another specified cell.

Figure 15:
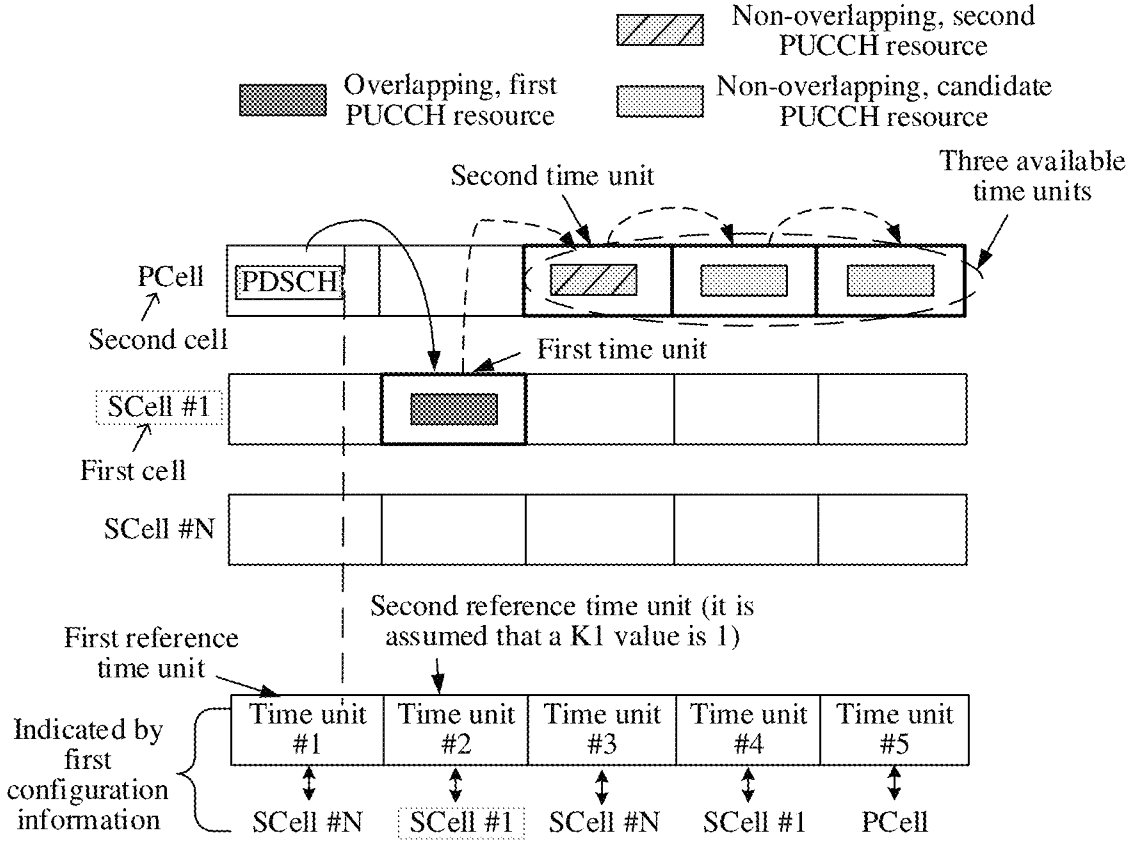
FIG. 15 is a schematic diagram of still another example of a feedback information transmission method 200 according to an embodiment of this application.

For example, as shown in FIG. 15, it is assumed that a default cell is a PCell, a first reference time unit is a time unit #1, a second reference time unit is a time unit #2, a first cell is an SCell #1 corresponding to the time unit #2, and a first time unit is a time unit shown by using a thick box in the SCell #1. Assuming that none of respective candidate PUCCH resources in three time units behind the first time unit in the PCell overlaps a downlink symbol and a flexible symbol, available time units in FIG. 15 are the three time units shown by using a dashed-line elliptic box in the PCell. Therefore, the second time unit is an earliest time unit in time domain in the three available time units, for example, a second time unit in the PCell shown in FIG. 15, and a second PUCCH resource is shown by using a gray padding block with stripes in the second time unit in the PCell shown in FIG. 15.

Optionally, when a first PUCCH resource in the first time unit in the first cell overlaps a downlink symbol or a flexible symbol, as shown by dashed-line arrows in FIG. 15, the terminal device may sequentially search for an available time unit based on a time domain sequence of the time units behind the first time unit on a default carrier, to obtain the second time unit and a second carrier, and further obtain the second PUCCH resource for transmitting HARQ feedback information. For example, in FIG. 15, assuming that only the time unit shown by using a last thick block in the PCell is the available time unit, the terminal device may sequentially determine, according to the dashed-line arrows, whether the candidate PUCCH resources in the time units overlap a downlink symbol or a flexible symbol, to obtain the available time unit, and further obtain the second time unit and the second cell.

It can be learned that in this implementation, when the HARQ feedback information cannot be sent because the first PUCCH resource overlaps the downlink symbol or the flexible symbol, the earliest available time unit in time domain may be determined as the second time unit on the default carrier, and the HARQ feedback information is sent on the candidate PUCCH resource in the second time unit. That is, the HARQ feedback information is transmitted in time through switching of the time domain and a frequency domain, so that a success rate of transmitting the HARQ feedback information is greatly improved.

Implementation 3.3: The second cell is a first cell, and the second time unit is an earliest available time unit in time domain in at least one available time unit in the second cell. A candidate PUCCH resource in each of the at least one available time unit does not overlap a downlink symbol or a flexible symbol.

It can be learned that in this implementation, when a first PUCCH resource overlaps a downlink symbol and a flexible symbol, the second time unit may continue to be determined in time units behind a first time unit in the first cell, so that the HARQ feedback information is sent in time.

The following describes the available time unit, the candidate PUCCH resource, the second time unit, and the like in this implementation with reference to the accompanying drawings by using an example.

Figure 16:
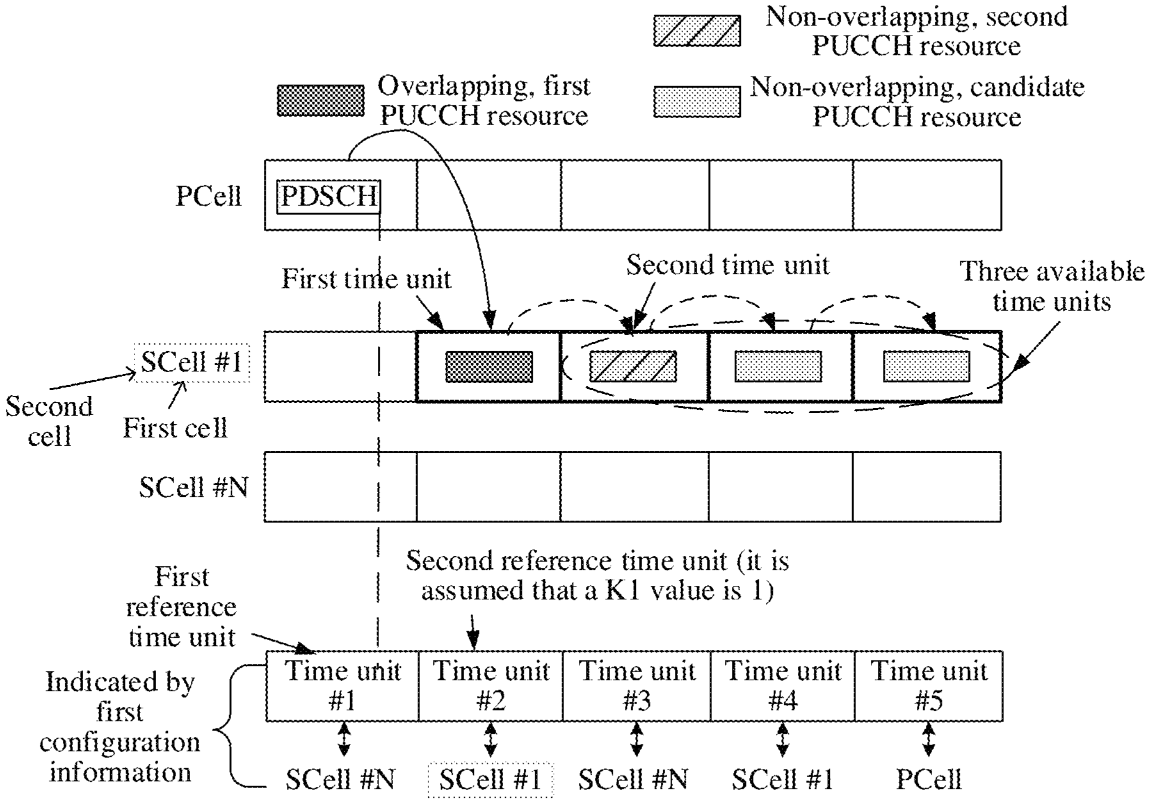
FIG. 16 is a schematic diagram of yet another example of a feedback information transmission method 200 according to an embodiment of this application.

For example, as shown in FIG. 16, a first reference time unit is a time unit #1, a second reference time unit is a time unit #2, a first carrier is an SCell #1 corresponding to the time unit #2, and a first time unit is a time unit shown by using a thick block in the SCell #1. Assuming that none of respective candidate PUCCH resources in three time units behind the first time unit in the SCell #1 overlaps a downlink symbol and a flexible symbol, available time units in FIG. 16 may be the three time units in a dashed-line elliptic box in the SCell #1. Therefore, the second time unit is an earliest time unit in time domain in the three available time units, for example, a second time unit in the PCell shown in FIG. 16, and a second PUCCH resource is shown by using a gray padding block with stripes in the second time unit in the PCell shown in FIG. 16.

Optionally, when a first PUCCH resource overlaps a downlink symbol or a flexible symbol, as shown by dashed-line arrows in FIG. 16, the terminal device may sequentially search for an available time unit based on a time domain sequence of the time units behind the first time unit in the first cell, to obtain the second time unit and a second cell, and further obtain the second PUCCH resource for transmitting HARQ feedback information. For example, in FIG. 16, assuming that only the time unit shown by using a last thick box in the SCell #1 is the available time unit, the terminal device may sequentially determine, according to the dashed line arrows, whether the reference PUCCH resources in the time units overlap a downlink symbol and a flexible symbol, until the terminal device finds the time unit shown by using the last thick box, to obtain the available time unit, and further obtain the second time unit.

It can be learned that in this implementation, when the first PUCCH resource overlaps the downlink symbol or the flexible symbol, the earliest available time unit in time domain may continue to be determined as the second time unit in the first cell, and the HARQ feedback information is sent on the candidate PUCCH resource in the second time unit, so that flexibility and a success rate of transmitting the HARQ feedback information are greatly improved.

It should be understood that if determining, according to a method different from the method shown in the method 100, that a time-frequency resource for sending the HARQ feedback information is unavailable, the terminal device needs to re-determine a time-frequency resource for sending the HARQ feedback information, where a time-frequency resource switching method shown in the method 200 is also applicable. That is, the method for determining the first PUCCH resource in the feedback information transmission method 200 is not limited in this application.

For example, it is assumed that the first PUCCH resource is determined in the semi-persistent scheduling manner in 2.1 or the dynamic scheduling manner in 2.2. To be specific, the cell in which the PDSCH is located is configured to send the HARQ feedback information of the PDSCH in the PCell or the PUCCH SCell, where the time unit in which the end symbol of the PDSCH is located is a fourth time unit, and a feedback time unit determined based on the fourth time unit and the K1 value corresponding to the K1 indication field in the DCI in the K1 set is a fifth time unit. In this case, if the first PUCCH resource for sending the HARQ feedback information in the fifth time unit in the PCell or the PUCCH SCell overlaps a time domain resource, a downlink symbol, or a flexible symbol of other information in time domain, the HARQ feedback information may be switched to another cell and another time unit for sending according to the feedback information transmission method 200. For example, the terminal device may use the fifth time unit in which the HARQ feedback information is sent as the first time unit in the feedback information transmission method 200, to perform content described in the foregoing Implementations 3.1 to 3.3, and determine a time unit without overlapping, to send the HARQ feedback information.

In addition, the PDSCH in Embodiment 1 and Embodiment 2 in this application may be a semi-persistently scheduled PDSCH, or may be a dynamically scheduled PDSCH. If the PDSCH is the dynamically scheduled PDSCH, DCI for scheduling the PDSCH may not include an indication field for directly indicating a carrier on which the HARQ feedback information is located.

In other words, the HARQ feedback information transmitted in the target time unit in the target cell in Embodiment 1, or the HARQ feedback information transmitted on the second PUCCH resource in the second time unit of the second cell in Embodiment 2 is HARQ feedback information of the semi-persistent scheduled PDSCH, or HARQ feedback information of the semi-persistent scheduled PDSCH and the dynamically scheduled PDSCH.

In this embodiment of this application, the first cell, the second cell, and the target cell may be different bandwidth parts (BWPs) in a same cell, and the cell may be a PCell or an SCell. For example, the first cell is a BWP 1 in the PCell, and the second cell or the target cell is a BWP 2 in the PCell.

The first cell or the second cell may be a part of frequency resources that have been configured for a cell, for example, different BWPs of a same cell or different subbands of a same BWP. The BWP may be a part of frequency resources that have been configured for a cell, and a frequency resource occupied by the subband is a part of frequency resources of one BWP. The following provides descriptions with reference to FIG. 17.

Figures 17, 18:
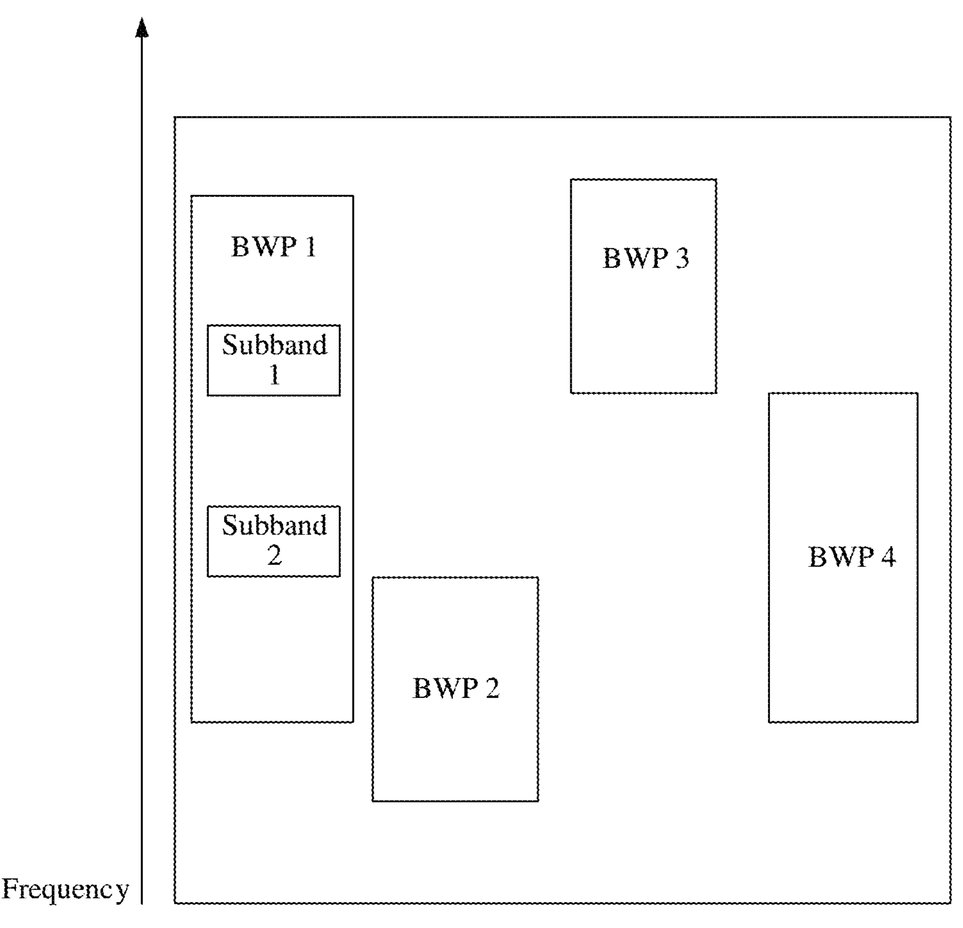
FIG. 17 is a schematic diagram of distribution of BWPs.
FIG. 18 is a schematic diagram of slot format configurations in two cells.

FIG. 17 is a schematic diagram of distribution of BWPs. As shown in FIG. 17, if BWPs of a cell include a BWP 1 to a BWP 4, and the BWP 1 includes a subband 1 and a subband 2, a target cell may be any one of the BWP 1 to the BWP 4. A first cell may include any one of the BWP 1 to the BWP 4. When a second cell is cell other than the first cell, the second cell may be a BWP other than the first cell in the BWP 1 to the BWP 4. Alternatively, a first cell may be any one of the subbands in the BWP 1, for example, the subband 1, and a second cell may be another subband other than the first cell in the BWP 1, for example, the subband 2.

Different cells, different BWPs in a same cell, or different subbands in a same BWP in a same cell may have different slot format configurations. FIG. 18 is a schematic diagram of slot format configurations in two cells. As shown in FIG. 18, time domain resource configurations of four time units in a cell 0 (namely, CC0) may be sequentially downlink, downlink, uplink, and uplink, and time domain resource configurations of four time units in a cell 1 (namely, CC1) may be sequentially downlink, uplink, downlink, and uplink.

In this embodiment of this application, the time unit may be a slot, a sub-slot, an OFDM symbol, or the like.

In the foregoing embodiments, descriptions of the embodiments have respective focuses. To avoid redundancy, for a part that is not described in detail in an embodiment, refer to related descriptions in other embodiments.

Figure 19:
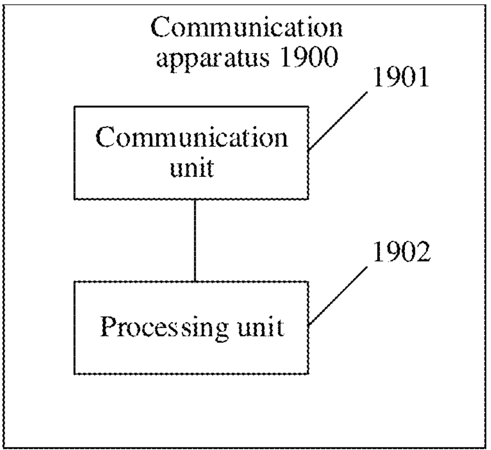
FIG. 19 is a schematic diagram of a structure of a communication apparatus 1900 according to an embodiment of this application.
Figure 20:
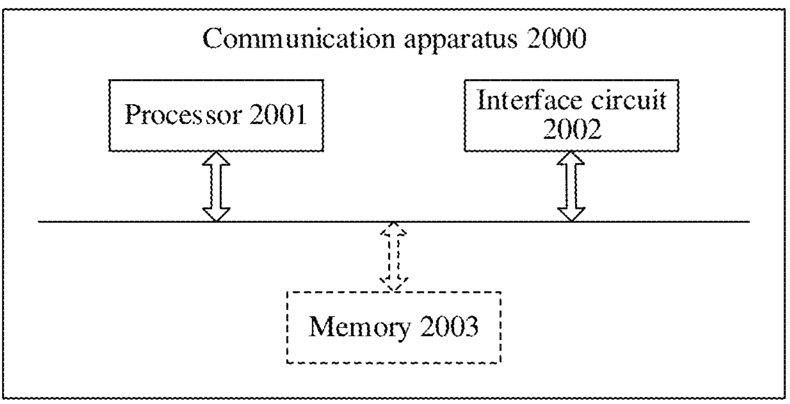
FIG. 20 is a schematic diagram of a structure of a communication apparatus 2000 according to an embodiment of this application.

To implement functions of any one of the feedback information transmission method 100 and the feedback information transmission method 200 provided in embodiments of this application, the network device and the terminal device may separately include a hardware structure and a software module, and implement the foregoing functions in a form of the hardware structure, the software module, or a combination of the hardware structure and the software module. One of the foregoing functions may be performed in a manner of the hardware structure, the software module, or the combination of the hardware structure and the software module. FIG. 19 and FIG. 20 each are a schematic diagram of a structure of a possible communication apparatus according to an embodiment of this application. The communication apparatus may be configured to implement functions of the terminal device or the network device in the foregoing method embodiments. Therefore, beneficial effects of the foregoing method embodiments can also be implemented.

The communication apparatus 1900 shown in FIG. 19 may include a communication unit 1901 and a processing unit 1902. The communication unit 1901 may include a sending unit and a receiving unit. The sending unit is configured to implement a sending function, the receiving unit is configured to implement a receiving function, and the communication unit 1901 may implement the sending function and/or the receiving function. The communication unit may also be described as a transceiver unit.

The communication apparatus 1900 may be a terminal device, or may be an apparatus in the terminal device, or may be an apparatus having functions of the terminal device.

In an implementation, the communication apparatus 1900 may implement related operations performed by the terminal device in Embodiment 1. The communication unit 1901 is configured to receive first configuration information, where the first configuration information indicates a one-to-one correspondence between M reference time units and a plurality of cells configured to send hybrid automatic repeat request HARQ feedback information in the M reference time units; and is further configured to receive a physical downlink shared channel PDSCH, where an end symbol of the PDSCH is located in a first reference time unit in the M reference time units. The processing unit 1902 is configured to determine a second reference time unit in the M reference time units based on the first reference time unit, where the second reference time unit is after the first reference time unit, the second reference time unit and the first reference time unit are separated by K1 reference time units, and K1 is an integer greater than or equal to 0; and is further configured to determine a target time unit in a target cell based on the second reference time unit and the one-to-one correspondence, where the target cell is a cell corresponding to the second reference time unit in the one-to-one correspondence, and the target time unit is a time unit that is in the target cell and that overlaps the second reference time unit in time domain. The communication unit 1901 is further configured to send HARQ feedback information of the PDSCH in the target time unit in the target cell. Time domain lengths of the M reference time units are the same, and the time domain lengths of the reference time units are determined based on a first subcarrier spacing. The first subcarrier spacing is: a largest subcarrier spacing in subcarrier spacings corresponding to the plurality of cells, or a smallest subcarrier spacing in subcarrier spacings corresponding to the plurality of cells. For more detailed descriptions of the processing unit 1902 and the communication unit 1901, refer to related descriptions in the method embodiment in Embodiment 1.

In another implementation, the communication apparatus 1900 may implement related operations performed by the terminal device in Embodiment 2. The communication unit 1901 is configured to receive first configuration information, where the first configuration information indicates a one-to-one correspondence between M reference time units and a plurality of cells configured to send hybrid automatic repeat request HARQ feedback information in the M reference time units, and M is a positive integer; and is further configured to receive a physical downlink shared channel PDSCH, where an end symbol of the PDSCH is located in a first reference time unit in the M reference time units. The processing unit 1902 is configured to determine a second reference time unit in the M reference time units based on the first reference time unit, where the second reference time unit is after the first reference time unit, the second reference time unit and the first reference time unit are separated by K1 reference time units, and K1 is an integer greater than or equal to 0; and is further configured to: determine a first time unit in a first cell based on the second reference time unit and the one-to-one correspondence, where the first cell is a cell corresponding to the second reference time unit in the one-to-one correspondence, and the first time unit is a time unit that is in the first cell and that overlaps the second reference time unit in time domain; and determine a second time unit when a first physical uplink control channel PUCCH resource overlaps a downlink symbol or a flexible symbol in time domain, where the second time unit is after the first time unit, and the first PUCCH resource is a PUCCH resource that is in the first cell and that is located in the first time unit. The communication unit 1901 is further configured to send the HARQ feedback information of the PDSCH on a second PUCCH resource in the second time unit, where the second PUCCH resource does not overlap a downlink symbol or a flexible symbol in time domain. For more detailed descriptions of the processing unit 1902 and the communication unit 1901, refer to related descriptions in the method embodiment in Embodiment 2.

The communication apparatus 1900 may be a network device, or may be an apparatus in the network device, or may be an apparatus having functions of the network device.

In an implementation, the communication apparatus 1900 may perform related operations performed by the network device in Embodiment 1. The communication unit 1901 is configured to send first configuration information, where the first configuration information indicates a one-to-one correspondence between M reference time units and a plurality of cells configured to send hybrid automatic repeat request HARQ feedback information in the M reference time units; and is further configured to send a physical downlink shared channel PDSCH, where an end symbol of the PDSCH is located in a first reference time unit in the M reference time units. The processing unit 1902 is configured to determine a second reference time unit in the M reference time units based on the first reference time unit, where the second reference time unit is after the first reference time unit, the second reference time unit and the first reference time unit are separated by K1 reference time units, and K1 is an integer greater than or equal to 0; and is configured to determine a target time unit in a target cell based on the second reference time unit and the one-to-one correspondence, where the target cell is a cell corresponding to the second reference time unit in the one-to-one correspondence, and the target time unit is a time unit that is in the target cell and that overlaps the second reference time unit in time domain. The communication unit 1901 is further configured to receive HARQ feedback information of the PDSCH in the target time unit in the target cell. Time domain lengths of the M reference time units are the same, and the time domain lengths of the reference time units are determined based on a first subcarrier spacing. The first subcarrier spacing is: a largest subcarrier spacing in subcarrier spacings corresponding to the plurality of cells, or a smallest subcarrier spacing in subcarrier spacings corresponding to the plurality of cells. For related content in this implementation, refer to related content in the foregoing method embodiment. In addition, the communication apparatus 1900 may further perform related operations in another embodiment.

In another implementation, the communication apparatus 1900 may perform related operations performed by the network device in Embodiment 2. The communication unit 1901 is configured to send first configuration information, where the first configuration information indicates a one-to-one correspondence between M reference time units and a plurality of cells configured to send hybrid automatic repeat request HARQ feedback information in the M reference time units, and M is a positive integer; and is further configured to send a physical downlink shared channel PDSCH, where an end symbol of the PDSCH is located in a first reference time unit in the M reference time units. The processing unit 1902 is configured to determine a second reference time unit in the M reference time units based on the first reference time unit, where the second reference time unit is after the first reference time unit, the second reference time unit and the first reference time unit are separated by K1 reference time units, and K1 is an integer greater than or equal to 0; is further configured to: determine a first time unit in a first cell based on the second reference time unit and the one-to-one correspondence, where the first cell is a cell corresponding to the second reference time unit in the one-to-one correspondence, and the first time unit is a time unit that is in the first cell and that overlaps the second reference time unit in time domain; and is further configured to determine a second time unit when a first physical uplink control channel PUCCH resource overlaps a downlink symbol or a flexible symbol in time domain, where the second time unit is after the first time unit, and the first PUCCH resource is a PUCCH resource that is in the first cell, is located in the first time unit, and is configured to carry HARQ feedback information of the PDSCH. The communication unit 1901 is further configured to receive the HARQ feedback information of the PDSCH on a second PUCCH resource in the second time unit, where the second PUCCH resource does not overlap a downlink symbol or a flexible symbol in time domain. For related content in this implementation, refer to related content in the foregoing method embodiment. In addition, the communication apparatus 1900 may further perform related operations in another embodiment.

A communication apparatus 2000 shown in FIG. 20 may include a processor 2001 and an interface circuit 2002. The processor 2001 and the interface circuit 2002 are coupled to each other. It may be understood that the interface circuit 2002 may be an interface circuit or an input/output interface. Optionally, the communication apparatus 2000 may further include a memory 2003, configured to: store instructions to be executed by the processor 2001, store input data required for running instructions by the processor 2001, or store data generated after the processor 2001 runs instructions.

The communication apparatus 2000 is a terminal device or a network device. The interface circuit 2002 is configured to perform S101, S102, and S104 in FIG. 6, and the processor 2001 performs S103. Alternatively, the interface circuit 2002 is configured to perform S201, S202, and S205 in FIG. 12, and the processor 2001 performs S203 and S204 in FIG. 12.

When the communication apparatus is a chip used in a terminal device, the chip in the terminal device implements functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a module used in a network device, the module in the network device implements functions of the network device in the foregoing method embodiments. The module in the network device receives information from another module (for example, a radio frequency module or an antenna) in the network device, where the information is sent by a terminal device to the network device. Alternatively, the module in the network device sends information to another module (for example, a radio frequency module or an antenna) in the network device, where the information is sent by the network device to a terminal device. The module in the network device herein may be a baseband chip in the network device, or may be a DU or another module. The DU herein may be a DU in an open radio access network (O-RAN) architecture.

It should be noted that the processor in this embodiment of this application may be a central processing unit (CPU), another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor or any conventional processor or the like.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to the processor, so that the processor can read information from the storage medium and write information into the storage medium. Certainly, the storage medium may alternatively be a component of the processor. The processor and the storage medium may be disposed in the ASIC. In addition, the ASIC may be located in the network device or the terminal device. Certainly, the processor and the storage medium may alternatively exist as discrete components in the network device or the terminal device.

All or some of the foregoing embodiments may be implemented by software, hardware, firmware, or any combination thereof. When software is used to implement the embodiments, all or some of embodiments may be implemented in a form of a computer program product. The computer program product includes one or more computer programs and instructions. When the computer programs or the instructions are loaded and executed on a computer, the procedures or the functions according to embodiments of this application are all or partially implemented. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium that can be accessed by the computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid-state drive. The computer-readable storage medium may be a volatile or nonvolatile storage medium, or may include two types of storage media: a volatile storage medium and a non-volatile storage medium.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

What is claimed is:

1. A method, wherein the method comprises:

receiving first configuration information, wherein the first configuration information indicates a one-to-one correspondence between M reference time units and a plurality of cells configured to send hybrid automatic repeat request (HARQ) feedback information in the M reference time units, and M is a positive integer;

receiving a physical downlink shared channel (PDSCH), wherein an end symbol of the PDSCH is located in a first reference time unit in the M reference time units;

determining a second reference time unit in the M reference time units based on the first reference time unit, wherein the second reference time unit is after the first reference time unit, the second reference time unit and the first reference time unit are separated by K1 reference time units, and K1 is an integer greater than or equal to o;

determining a first time unit in a first cell based on the second reference time unit and the one-to-one correspondence, wherein the first cell corresponds to the second reference time unit in the one-to-one correspondence, and the first time unit in the first cell overlaps the second reference time unit in the time domain;

determining a second time unit when a first physical uplink control channel (PUCCH) resource overlaps a downlink symbol or a flexible symbol in the time domain, wherein the second time unit is after the first time unit, and the first PUCCH resource is in the first cell, is located in the first time unit, and is configured to carry HARQ feedback information of the PDSCH; and sending the HARQ feedback information of the PDSCH on a second PUCCH resource in the second time unit, wherein the second PUCCH resource does not overlap any downlink symbol or any flexible symbol in the time domain.

2. The method according to claim 1, wherein the second time unit is in a second cell; and wherein the second cell corresponds to a third reference time unit in the M reference time units in the one-to-one correspondence, the second time unit is in the second cell and overlaps the third reference time unit in the time domain, and the third reference time unit is an earliest available reference time unit in the time domain in at least one available reference time unit; and each of the at least one available reference time unit is after the second reference time unit, a cell corresponding to each available reference time unit in the one-to-one correspondence is an available candidate cell, a candidate PUCCH resource in a third time unit in the available candidate cell does not overlap any downlink symbol or any flexible symbol, and the third time unit is in the available candidate cell and overlaps a reference time unit in the time domain corresponding to the available candidate cell in the one-to-one correspondence; or wherein the second cell is a primary cell (PCell) or the first cell, the second time unit is an earliest available time unit in the time domain in at least one available time unit in the second cell, and a corresponding candidate PUCCH resource in each of the at least one available time unit does not overlap any downlink symbol or any flexible symbol, wherein the corresponding candidate PUCCH resource is configured to carry the HARQ feedback information.

3. The method according to claim 2, wherein there are a plurality of time units in the second cell that overlap the third reference time unit in the time domain, the second time unit is at a foremost time domain location of the plurality of time units in the second cell that overlap the third reference time unit in the time domain.

4. The method according to claim 1, wherein:

time domain lengths of the M reference time units are the same, the time domain lengths of the M reference time units are determined based on a first subcarrier spacing, and the first subcarrier spacing is: a largest subcarrier spacing in subcarrier spacings corresponding to the plurality of cells, or a smallest subcarrier spacing in the subcarrier spacings corresponding to the plurality of cells.

5. The method according to claim 1, wherein:

K1 is indicated by downlink control information (DCI) for scheduling the PDSCH, and K1 is a value in a K1 set.

6. The method according to claim 5, wherein:

the K1 set is configured for a cell in which the PDSCH is located;

the K1 set is configured for a carrier of a PCell accessed by a terminal device in the plurality of cells;

the K1 set is configured for a carrier with a smallest subcarrier spacing in the plurality of cells; or the K1 set is configured for a carrier with a largest subcarrier spacing in the plurality of cells.

7. A method, wherein the method comprises:

sending first configuration information, wherein the first configuration information indicates a one-to-one correspondence between M reference time units and a plurality of cells configured to send hybrid automatic repeat request (HARQ) feedback information in the M reference time units, and M is a positive integer;

sending a physical downlink shared channel (PDSCH), wherein an end symbol of the PDSCH is located in a first reference time unit in the M reference time units;

determining a second reference time unit in the M reference time units based on the first reference time unit, wherein the second reference time unit is after the first reference time unit, the second reference time unit and the first reference time unit are separated by K1 reference time units, and K1 is an integer greater than or equal to o;

determining a first time unit in a first cell based on the second reference time unit and the one-to-one correspondence, wherein the first cell corresponds to the second reference time unit in the one-to-one correspondence, and the first time unit is in the first cell and overlaps the second reference time unit in the time domain;

determining a second time unit when a first physical uplink control channel (PUCCH) resource overlaps a downlink symbol or a flexible symbol in the time domain, wherein the second time unit is after the first time unit, and the first PUCCH resource is in the first cell, is located in the first time unit, and is configured to carry HARQ feedback information of the PDSCH; and receiving the HARQ feedback information of the PDSCH on a second PUCCH resource in the second time unit, wherein the second PUCCH resource does not overlap any downlink symbol or any flexible symbol in the time domain.

8. The method according to claim 7, wherein the second time unit is in a second cell; and wherein the second cell corresponds to a third reference time unit in the M reference time units in the one-to-one correspondence, the second time unit is in the second cell and overlaps the third reference time unit in the time domain, and the third reference time unit is an earliest available reference time unit in the time domain in at least one available reference time unit; and each of the at least one available reference time unit is after the second reference time unit, a cell corresponding to each available reference time unit in the one-to-one correspondence is an available candidate cell, a candidate PUCCH resource in a third time unit in the available candidate cell does not overlap any downlink symbol or any flexible symbol, and the third time unit is in the available candidate cell and overlaps a reference time unit in the time domain corresponding to the available candidate cell in the one-to-one correspondence; or wherein the second cell is a primary cell (PCell) or the first cell, the second time unit is an earliest available time unit in the time domain in at least one available time unit in the second cell, and a corresponding candidate PUCCH resource in each of the at least one available time unit does not overlap any downlink symbol or any flexible symbol, wherein the corresponding candidate PUCCH resource is configured to carry the HARQ feedback information.

9. The method according to claim 8, wherein there are a plurality of time units in the second cell that overlap the third reference time unit in the time domain, the second time unit is at a foremost time domain location of the plurality of time units in the second cell that overlap the third reference time unit in the time domain.

10. The method according to claim 7, wherein:

time domain lengths of the M reference time units are the same, the time domain lengths of the M reference time units are determined based on a first subcarrier spacing, and the first subcarrier spacing is: a largest subcarrier spacing in subcarrier spacings corresponding to the plurality of cells, or a smallest subcarrier spacing in the subcarrier spacings corresponding to the plurality of cells.

11. The method according to claim 7, wherein:

K1 is indicated by downlink control information (DCI) for scheduling the PDSCH, and K1 is a value in a K1 set.

12. The method according to claim 11, wherein:

the K1 set is configured for a cell in which the PDSCH is located;

the K1 set is configured for a carrier of a PCell accessed by a terminal device in the plurality of cells;

the K1 set is configured for a carrier with a smallest subcarrier spacing in the plurality of cells; or the K1 set is configured for a carrier with a largest subcarrier spacing in the plurality of cells.

13. A communication apparatus, comprising:

one or more processors, wherein the one or more processors processors are configured to execute operations comprising:

receiving first configuration information, wherein the first configuration information indicates a one-to-one correspondence between M reference time units and a plurality of cells configured to send hybrid automatic repeat request (HARQ) feedback information in the M reference time units, and M is a positive integer;

receiving a physical downlink shared channel (PDSCH), wherein an end symbol of the PDSCH is located in a first reference time unit in the M reference time units;

determining a second reference time unit in the M reference time units based on the first reference time unit, wherein the second reference time unit is after the first reference time unit, the second reference time unit and the first reference time unit are separated by K1 reference time units, and K1 is an integer greater than or equal to o;

determining a first time unit in a first cell based on the second reference time unit and the one-to-one correspondence, wherein the first cell corresponds to the second reference time unit in the one-to-one correspondence, and the first time unit is in the first cell and overlaps the second reference time unit in the time domain;

determining a second time unit when a first physical uplink control channel (PUCCH) resource overlaps a downlink symbol or a flexible symbol in the time domain, wherein the second time unit is after the first time unit, and the first PUCCH resource is in the first cell, is located in the first time unit, and is configured to carry HARQ feedback information of the PDSCH; and sending the HARQ feedback information of the PDSCH on a second PUCCH resource in the second time unit, wherein the second PUCCH resource does not overlap any downlink symbol or any flexible symbol in the time domain.

14. The communication apparatus according to claim 13, wherein the second time unit is in a second cell; and wherein the second cell corresponds to a third reference time unit in the M reference time units in the one-to-one correspondence, the second time unit is in the second cell and overlaps the third reference time unit in the time domain, and the third reference time unit is an earliest available reference time unit in the time domain in at least one available reference time unit; and each of the at least one available reference time unit is after the second reference time unit, a cell corresponding to each available reference time unit in the one-to-one correspondence is an available candidate cell, a candidate PUCCH resource in a third time unit in the available candidate cell does not overlap any downlink symbol or any flexible symbol, and the third time unit is in the available candidate cell and overlaps a reference time unit in the time domain corresponding to the available candidate cell in the one-to-one correspondence; or wherein the second cell is a primary cell (PCell) or the first cell, the second time unit is an earliest available time unit in the time domain in at least one available time unit in the second cell, and a corresponding candidate PUCCH resource in each of the at least one available time unit does not overlap any downlink symbol or any flexible symbol, wherein the corresponding candidate PUCCH resource is configured to carry the HARQ feedback information.

15. The communication apparatus according to claim 14, wherein there are a plurality of time units in the second cell that overlap the third reference time unit in the time domain, the second time unit is at a foremost time domain location of the plurality of time units in the second cell that overlap the third reference time unit in the time domain.

16. The communication apparatus according to claim 13, wherein:

time domain lengths of the M reference time units are the same, the time domain lengths of the M reference time units are determined based on a first subcarrier spacing, and the first subcarrier spacing is: a largest subcarrier spacing in subcarrier spacings corresponding to the plurality of cells, or a smallest subcarrier spacing in the subcarrier spacings corresponding to the plurality of cells.

17. The communication apparatus according to claim 13, wherein

K1 is indicated by downlink control information (DCI) for scheduling the PDSCH, and K1 is a value in a K1 set.

18. The communication apparatus according to claim 17, wherein the K1 set is configured for a cell in which the PDSCH is located;

the K1 set is configured for a carrier of a PCell accessed by a terminal device in the plurality of cells;

the K1 set is configured for a carrier with a smallest subcarrier spacing in the plurality of cells; or the K1 set is configured for a carrier with a largest subcarrier spacing in the plurality of cells.

19. A communication apparatus, comprising:

one or more processors, wherein the one or more processors are configured to execute operations comprising:

sending first configuration information, wherein the first configuration information indicates a one-to-one correspondence between M reference time units and a plurality of cells configured to send hybrid automatic repeat request (HARQ) feedback information in the M reference time units, and M is a positive integer;

sending a physical downlink shared channel (PDSCH), wherein an end symbol of the PDSCH is located in a first reference time unit in the M reference time units;

determining a second reference time unit in the M reference time units based on the first reference time unit, wherein the second reference time unit is after the first reference time unit, the second reference time unit and the first reference time unit are separated by K1 reference time units, and K1 is an integer greater than or equal to o;

determining a first time unit in a first cell based on the second reference time unit and the one-to-one correspondence, wherein the first cell corresponds to the second reference time unit in the one-to-one correspondence, and the first time unit is in the first cell and overlaps the second reference time unit in the time domain;

determining a second time unit when a first physical uplink control channel (PUCCH) resource overlaps a downlink symbol or a flexible symbol in the time domain, wherein the second time unit is after the first time unit, and the first PUCCH resource is in the first cell, is located in the first time unit, and is configured to carry HARQ feedback information of the PDSCH; and receiving the HARQ feedback information of the PDSCH on a second PUCCH resource in the second time unit, wherein the second PUCCH resource does not overlap any downlink symbol or any flexible symbol in the time domain.

20. The communication apparatus according to claim 19, wherein the second time unit is in a second cell; and wherein the second cell corresponds to a third reference time unit in the M reference time units in the one-to-one correspondence, the second time unit is in the second cell and overlaps the third reference time unit in the time domain, and the third reference time unit is an earliest available reference time unit in the time domain in at least one available reference time unit; and each of the at least one available reference time unit is after the second reference time unit, a cell corresponding to each available reference time unit in the one-to-one correspondence is an available candidate cell, a candidate PUCCH resource in a third time unit in the available candidate cell does not overlap any downlink symbol or any flexible symbol, and the third time unit is in the available candidate cell and overlaps a reference time unit in the time domain corresponding to the available candidate cell in the one-to-one correspondence; or wherein the second cell is a primary cell (PCell) or the first cell, the second time unit is an earliest available time unit in the time domain in at least one available time unit in the second cell, and a corresponding candidate PUCCH resource in each of the at least one available time unit does not overlap any downlink symbol or any flexible symbol, wherein the corresponding candidate PUCCH resource is configured to carry the HARQ feedback information.

* * * * *